United States Patent
Xue et al.

(10) Patent No.: US 12,267,860 B2
(45) Date of Patent: **\*Apr. 1, 2025**

(54) RELAXED SENSING FOR NEW RADIO SIDELINK OVER MILLIMETER WAVE OPERATING FREQUENCIES

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,937

(22) Filed: Sep. 12, 2023

(65) Prior Publication Data

US 2024/0129947 A1    Apr. 18, 2024

Related U.S. Application Data

(63) Continuation of application No. 17/451,417, filed on Oct. 19, 2021, now Pat. No. 11,812,458.

(51) Int. Cl.
*H04W 72/541* (2023.01)
*H04W 72/1263* (2023.01)
(Continued)

(52) U.S. Cl.
CPC ..... *H04W 72/541* (2023.01); *H04W 72/1263* (2013.01); *H04W 74/0816* (2013.01); *H04W 72/0446* (2013.01)

(58) Field of Classification Search
None
See application file for complete search history.

(56) References Cited

U.S. PATENT DOCUMENTS 10,390,305 B1 * 8/2019 Geekie .............. H04W 52/0293
11,812,458 B2 * 11/2023 Xue .................... H04W 72/541
(Continued)

FOREIGN PATENT DOCUMENTS

EP        3497996 A1   6/2019
WO    WO-2021064135 A1   4/2021
(Continued)

OTHER PUBLICATIONS

International Search Report and Written Opinion—PCT/US2022/076155—ISA/EPO—Dec. 19, 2022.
(Continued)

*Primary Examiner* — Alex Skripnikov
(74) *Attorney, Agent, or Firm* — Norton Rose Fulbright US LLP

(57) ABSTRACT

This disclosure provides systems, methods, and devices for wireless communication that support relaxed sensing for new radio (NR) sidelink over millimeter wave (mmW) operating frequencies. In a first aspect, a method by a user equipment (UE) of wireless communication includes identifying a resource selection trigger that indicates selection of one or more sidelink slots from a resource selection window. The UE may obtain long-term interference sensing statistics observed by the UE prior to the resource selection trigger. The UE can reduce a default sensing window length in accordance with the long-term interference sensing statistics and transmit a sidelink transmission in the selected sidelink slots. Other aspects and features are also claimed and described.

20 Claims, 13 Drawing Sheets

(51) Int. Cl.
*H04W 74/0816* (2024.01)
*H04W 72/0446* (2023.01)

(56) References Cited

U.S. PATENT DOCUMENTS

| | | |
|---|---|---|
| 2018/0359069 A1 | 12/2018 | Nam et al. |
| 2020/0229171 A1 | 7/2020 | Khoryaev et al. |
| 2020/0252781 A1* | 8/2020 | Edge .................. H04W 40/20 |
| 2020/0314804 A1 | 10/2020 | Shin et al. |
| 2020/0374861 A1 | 11/2020 | Shilov et al. |
| 2021/0007081 A1 | 1/2021 | Shin et al. |
| 2021/0352677 A1* | 11/2021 | Fouad ................ H04W 72/0466 |
| 2022/0132469 A1 | 4/2022 | Aktas et al. |
| 2022/0132486 A1 | 4/2022 | Aktas et al. |
| 2022/0225408 A1 | 7/2022 | Lee et al. |
| 2023/0028889 A1 | 1/2023 | Kim et al. |
| 2023/0111530 A1 | 4/2023 | Liu et al. |
| 2023/0120774 A1 | 4/2023 | Xue et al. |
| 2023/0337187 A1* | 10/2023 | Ye ...................... H04W 52/0235 |
| 2024/0032099 A1* | 1/2024 | Hoang .............. H04W 74/0816 |
| 2024/0064777 A1* | 2/2024 | Zhang ................... H04W 72/25 |
| 2024/0389075 A1* | 11/2024 | Ko .......................... H04W 4/40 |

FOREIGN PATENT DOCUMENTS

| | | |
|---|---|---|
| WO | WO-2021071230 A1 | 4/2021 |
| WO | WO-2021163460 A1 | 8/2021 |
| WO | WO-2021207473 A1 | 10/2021 |
| WO | WO-2022115814 A1 | 6/2022 |
| WO | WO-2022123429 A1 | 6/2022 |
| WO | WO-2022151600 A1 | 7/2022 |
| WO | WO-2022207455 A1 | 10/2022 |
| WO | WO-2022212267 A1 | 10/2022 |
| WO | WO-2023014820 A1 | 2/2023 |
| WO | WO-2023043241 A1 | 3/2023 |
| WO | WO-2023055219 A1 | 4/2023 |

OTHER PUBLICATIONS

Moderator (OPPO): "FL Summary for AI 8.11 .1.1—Resource Allocation for Power Saving (final EOM)", 3GPP TSG RAN WG1 #105-e, R1-2106033, 3rd Generation Partnership Project (3GPP), Mobile Competence Centre, 650 , Route Des Lucioles, F-06921, Sophia-Antipolis Cedex, France, May 10, 2021-May 27, 2021, May 27, 2021, 92 Pages, XP052015707, pp. 82, 83.

Robert Bosch Gmbh: "Discussion on Reduce Power Consumption for Sidelink", 3GPP TSG RAN WG1 #104-e, R1-2101400, 3rd Generation Partnership Project (3GPP), Mobile Competence Centre, 650, Route Des Lucioles, F-06921, Sophia-Antipolis Cedex, France, Jan. 25, 2020-Feb. 5, 2020, Jan. 18, 2021, XP051971567, 10 Pages, Section 2.2.2.3.

Robert Bosch Gmbh: "Sidelink Resource Allocation to Reduce Power Consumption", 3GPP TSG RAN WG1 #103-e, R1-2009128, 3rd Generation Partnership Project (3GPP), Mobile Competence Centre, 650, Route Des Lucioles, F-06921, Sophia-Antipolis Cedex, France, Oct. 26, 2020-Nov. 13, 2020, Oct. 24, 2020, 7 Pages, XP051946845, Section 2.2.3.1.

* cited by examiner

RELAXED SENSING FOR NEW RADIO SIDELINK OVER MILLIMETER WAVE OPERATING FREQUENCIES

CROSS REFERENCE

The present application for patent is a continuation of U.S. Non-Provisional application Ser. No. 17/451,417 by XUE et al., entitled "RELAXED SENSING FOR NEW RADIO SIDELINK OVER MILLIMETER WAVE OPERATING FREQUENCIES," filed Oct. 19, 2021, which is assigned to the assignee hereof, and is expressly incorporated by reference herein in its entirety.

TECHNICAL FIELD

Aspects of the present disclosure relate generally to wireless communication systems, and more particularly, to new radio (NR) sidelink operations. Some features may enable and provide improved communications, including relaxed sensing for NR sidelink over millimeter wave (mmW) operating frequencies.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes identifying, by the UE, a resource selection trigger indicating selection of one or more sidelink slots from a resource selection window that includes a set of candidate sidelink slots of a plurality of available sidelink slots, obtaining, by the UE, long-term interference sensing statistics observed by the UE prior to the resource selection trigger, reducing, by the UE, a default sensing window length in accordance with the long-term interference sensing statistics, and transmitting, by the UE, a sidelink transmission in the one or more sidelink slots.

In an additional aspect of the disclosure, an apparatus configured for wireless communication is disclosed. The apparatus includes at least one processor, and a memory coupled to the at least one processor. The at least one processor is configured to includes identify, by the UE, a resource selection trigger indicating selection of one or more sidelink slots from a resource selection window that includes a set of candidate sidelink slots of a plurality of available sidelink slots, to obtain, by the UE, long-term interference sensing statistics observed by the UE prior to the resource selection trigger, to reduce, by the UE, a default sensing window length in accordance with the long-term interference sensing statistics, and to transmit, by the UE, a sidelink transmission in the one or more sidelink slots.

In an additional aspect of the disclosure, an apparatus configured for wireless communication is disclosed. The apparatus further includes means for identifying, by the UE, a resource selection trigger indicating selection of one or more sidelink slots from a resource selection window that includes a set of candidate sidelink slots of a plurality of available sidelink slots, means for obtaining, by the UE, long-term interference sensing statistics observed by the UE prior to the resource selection trigger, means for reducing, by the UE, a default sensing window length in accordance with the long-term interference sensing statistics, and means for transmitting, by the UE, a sidelink transmission in the one or more sidelink slots.

In an additional aspect of the disclosure, a non-transitory computer-readable medium stores instructions that, when executed by a processor, cause the processor to perform operations including identifying, by the UE, a resource selection trigger indicating selection of one or more sidelink slots from a resource selection window that includes a set of candidate sidelink slots of a plurality of available sidelink slots, obtaining, by the UE, long-term interference sensing statistics observed by the UE prior to the resource selection trigger, reducing, by the UE, a default sensing window length in accordance with the long-term interference sensing statistics, and transmitting, by the UE, a sidelink transmission in the one or more sidelink slots.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
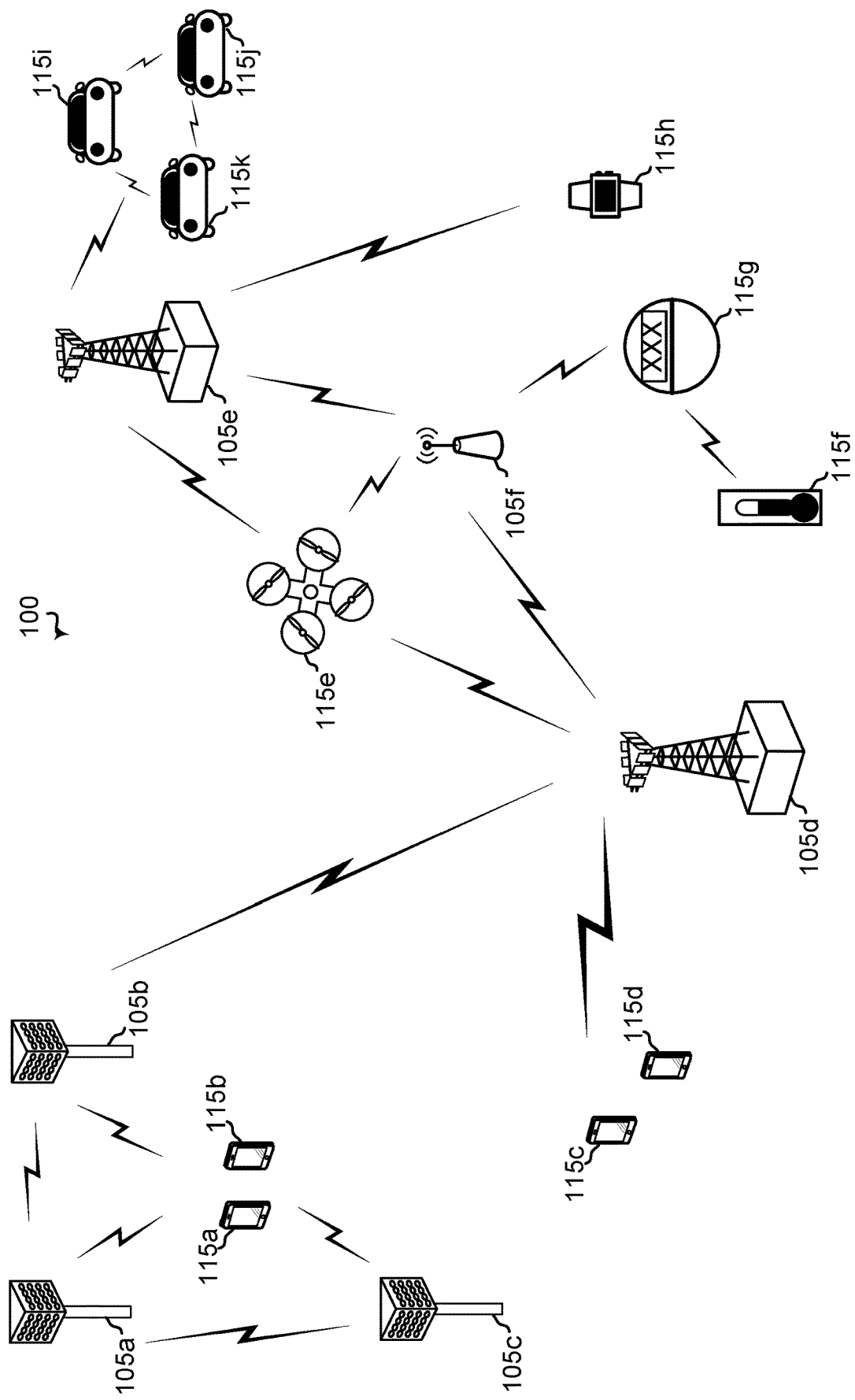
FIG. 1 is a block diagram illustrating example details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support relaxed sensing for NR sidelink over mmW operating frequencies according to one or more aspects of the present disclosure. Particular implementations of the subject matter described in this disclosure may be implemented to realize one or more of the following potential advantages or benefits. In some aspects, the present disclosure provides techniques for adaptive reduction of a default sensing window length for autonomous sidelink transmission by a transmit (TX) sidelink UE. By adaptively reducing the length of the sensing window, including to a length of 0 for no-sensing, using historical interference sensing statistics, battery power for battery-powered UEs may be conserved. Additionally, the potential latency time for accessing a shared communication channel for sidelink transmissions may be reduced.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "mmW" band.

The frequencies between FR1 and FR2 are often referred to as mid-band frequencies. Recent 5G NR studies have identified an operating band for these mid-band frequencies as frequency range designation FR3 (7.126 GHz-24.25 GHz). Frequency bands falling within FR3 may inherit FR1 characteristics and/or FR2 characteristics, and, thus, may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2x/FR2-2 (52.6 GHz-71 GHz), FR4 (71 GHz-114.25 GHz), and FR5 (114.25 GHz-275 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmW" or the like if used herein may broadly represent frequencies that may include mid-band frequencies, may be within FR2, FR2x/FR2-2, FR4, and/or FR5, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmW transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmW components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
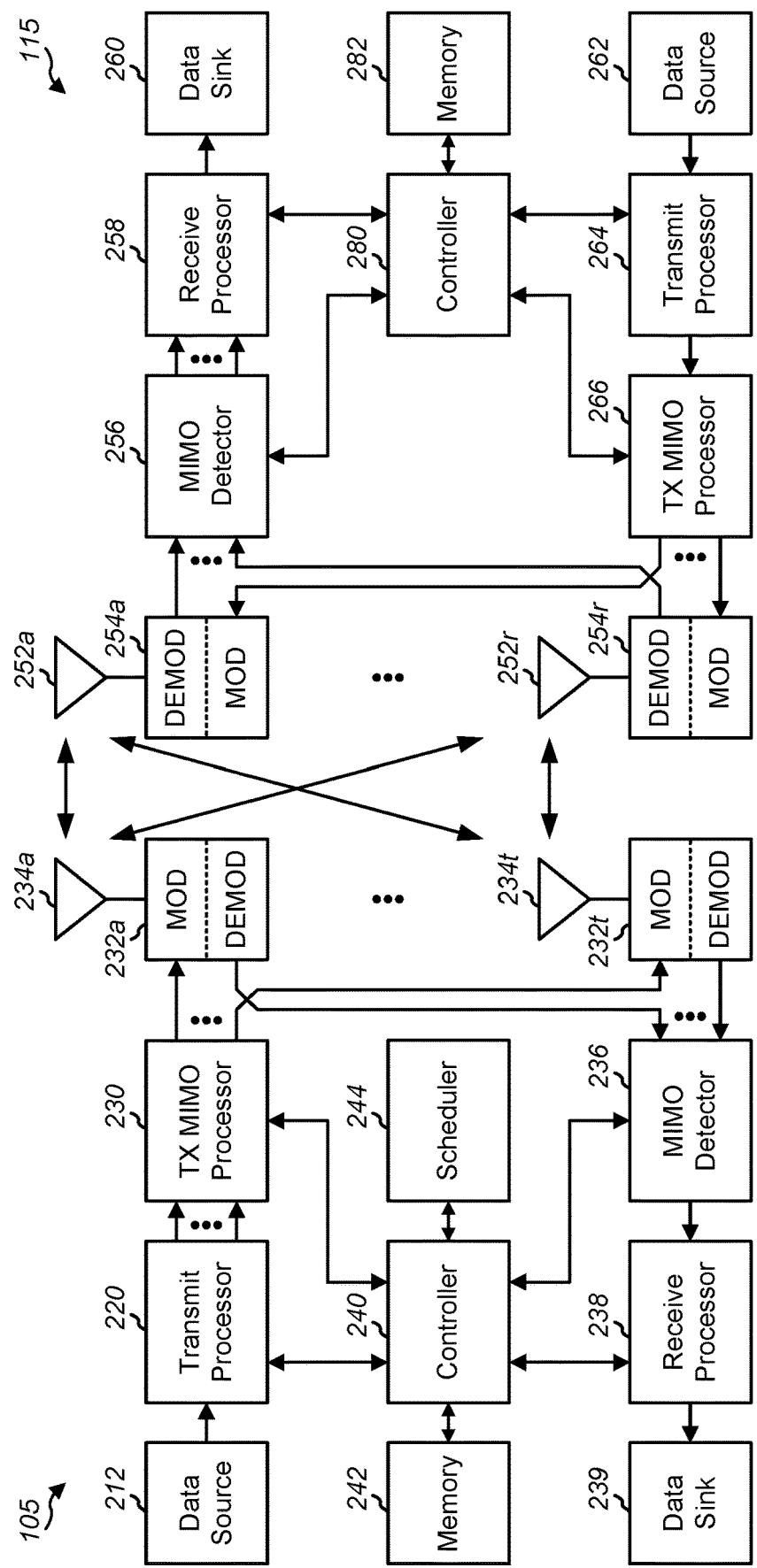
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 4, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-µs, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-µs slots, may also be referred to as a "Type 1 LBT." An abbreviated LBT procedure, such as a CAT 2 LBT procedure, which may include a one-shot CCA for 16-µs or 25-µs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

The 3GPP Release 16 (Rel-16) standards have provided for various use cases of new radio (NR) sidelink (SL) operations, such as for the vehicle-to-everything (V2X) use case. The network may configure sets of resources available for UE sidelink communications. Each such transmission resource pool may be linked to one of the two channel access modes. In a first access mode (Mode 1), for in-coverage deployment, SL UEs may receive grants from serving base stations for channel access to resources within the transmission resource pools. In-coverage generally refers to an SL UE detecting at least one cell on the frequency on which it is configured to perform NR sidelink communications that measures to be suitable for communications. Where no suitable cell is detected on this configured frequency, the SL UE is considered to be out-of-coverage. In a second access mode (Mode 2), for out-of-coverage deployment, SL UEs may use autonomous sensing for channel access.

Figure 3:
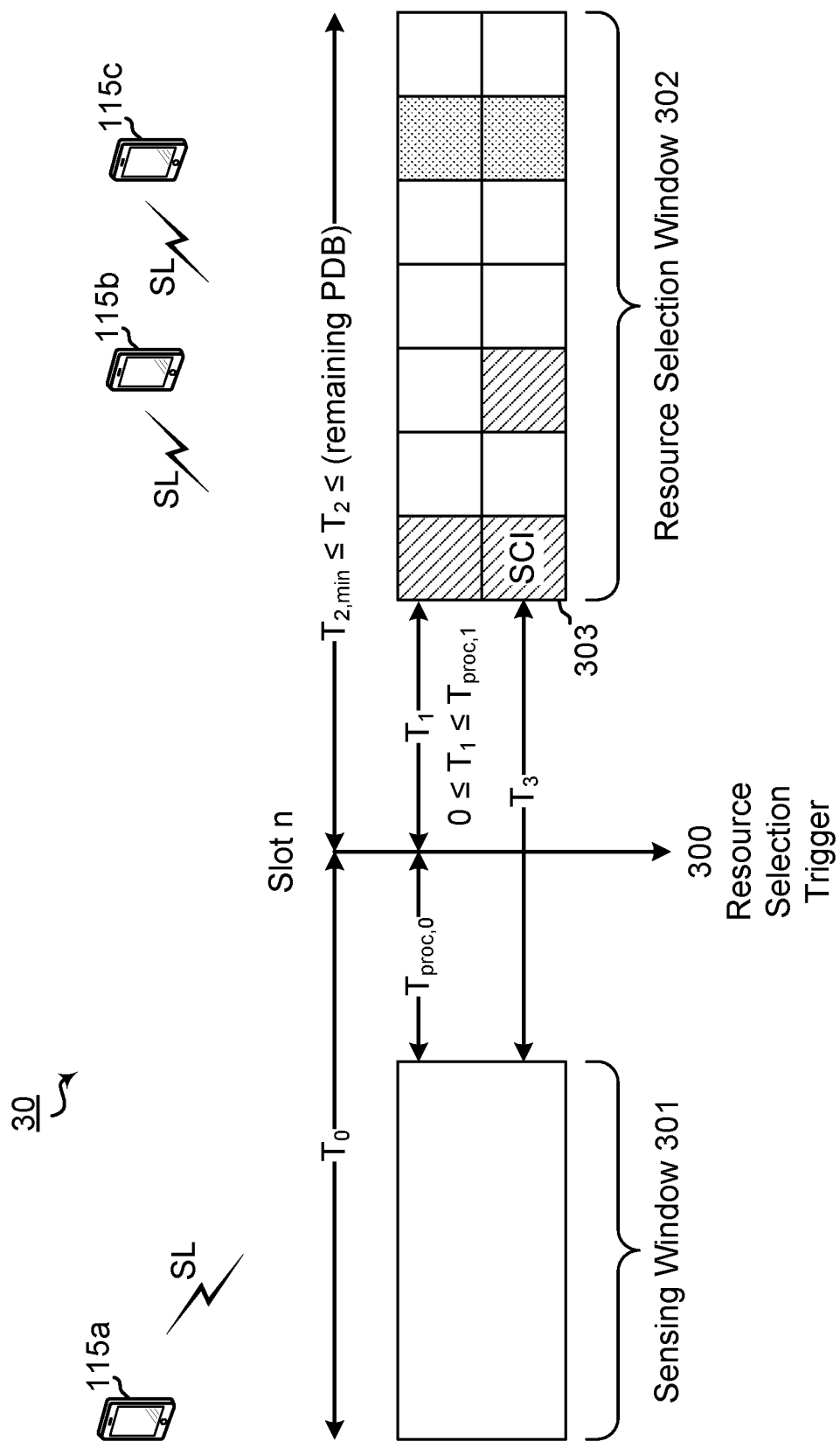
FIG. 3 is a block diagram illustrating an example NR network configured for sidelink communications over unlicensed spectrum between any one or more of UEs operating in the Mode 2 access mode.

FIG. 3 is a block diagram illustrating an example NR network configured for sidelink communications over unlicensed spectrum between any one or more of UEs operating in the Mode 2 access mode. An available set of resources for sidelink communications is identified at slot n. With identification of such resources of slot n, a sidelink transmitting (TX) UE, such as UE 115a, may define sensing window 301 prior to resource selection trigger 300, and resource selection window 302 after resource selection trigger 300. When a resource selection is triggered at slot n, resource selection trigger 300, UE 115a physical (PHY) layer may examine the shared spectrum during sensing window 301 to identify the set of candidate resources in resource selection window 302 and reports to the medium access control (MAC) layer of UE 115a. Specifically, $T_1$ is a UE implementation value being not larger than $T_{proc,1}$. represents the processing time for UE 115a for any detected signals during sensing window 301 and preparation for transmission in one or more of the selected sidelink candidate resources of resource selection window 302. Among the candidate resources reported by the PHY layer of UE 115a, the MAC layer of UE 115a would then randomly select one or more of the candidate resource blocks of resource selection window 302 for transmission.

It should be noted that the PHY layer of UE 115a may read COT-sharing indications sent by other SL UEs and report to the MAC layer which resources can be accessed with a Type 2 LBT.

It should further be noted that where the intended sidelink communications with reservation for hybrid automatic receipt request (HARQ) retransmission, the sidelink transmission resources for multiple PSSCHs for the same transport block (TB) may be randomly selected by the MAC layer of UE 115a as well.

In addition, an NR sidelink TX UE, such as UE 115a, with 5G NR operations in Mode 2 would continuously sense channel up to $T_3$ before the actual TX selected (referred to as "last-minute re-evaluation"). The MAC layer of UE 115a may request the PHY layer to update available resources at this instant to double check whether the coming resource, as well as other reservations in the future, are still available. The PHY layer of UE 115a responds to the MAC layer regarding all available resources at this instant and, if the resource for the coming PSSCH is not available anymore, UE 115a sets the re-selection flag to the MAC layer. After receiving this flag, the MAC layer of UE 115a will randomly re-select a resource from available candidate resource sets of resource selection window 302. This may lead to a new $T_3$ based the re-evaluation. Otherwise, the PHY layer of UE 115a may expect to transmit over the pre-selected sidelink resource.

As Mode 2 resource allocation/channel access was specified for autonomous/out-of-coverage deployment, upon resource selection trigger 300, the TX UE, UE 115a, performs sensing in sensing window 301 to determine a set of available sidelink resources in resource selection window 302. In one example implementation, UE 115a may perform random selection for up to three resources in resource selection window 302 for sidelink channel access. UE 115a may then transmit sidelink control information (SCI) 303 to indicate both occupancy in current slot, and reservation of up-to two future subchannels as input to other UEs', such as UEs 115b and 115c, sensing procedure. SCI 303 can also carry a field indicating reservation of periodical channel access.

In a resource pool supporting both periodic reservation and dynamic reservation, a TX UE, such as UE 115a, would perform sensing in a relatively long sensing window, such as sensing window 301, to take care of potential collisions among different traffic types. SCI 303 can also dynamically reserve a future sub-channel that is up to 31-slots away from current slot occupancy. This would result in sensing window 301 being at least 32 slots long. For periodic reservations, the maximum duty cycle currently identified for periodical reservations is 1000 ms. Thus, in a maximum duty cycle scenario, sensing window 301 would be at least 1000 ms long.

Implementing such access procedures using a long sensing period for vehicular UEs may not present any power-related issues, as a vehicle may have access to higher power resources. However, a long sensing period may be a burden for battery-powered UEs having more limited power resources. This power disparity may have informed development of partial sensing for 3GPP Release 17 (Rel-17). Thus, under Rel-17 specifications, a battery powered UE can conduct partial sensing or no-sensing for channel access. In the partial and no-sensing cases, the random selection of resources in the resource selection window may play a role for collision avoidance. Specifically, a battery powered TX UE can further run periodic partial sensing or/and contiguous partial sensing to suppress the potential collision due to periodic reservations or/and dynamic reservations. Thus, the resulting performance of Rel-17 on partial sensing can serve as the starting point for any further simplification of the full sensing procedures developed in Rel-16.

In developing the specifications for 3GPP Release 18 (Rel-18), considerations specifically for battery powered UEs may provide an avenue for expansion of NR SL operations into other vertical domains. Current considerations have focused on access within sub-6 GHz bands. However, not every vertical domain will have access to the sub-6 GHz bands. There may be more readily available bandwidth for sidelink communication deployments within the 6 GHz and 60 GHz unlicensed bands. Additionally, there may be rate/reliability intensive applications for some vertical domains envisioned for NR SL operations, e.g., extended reality (XR) application. It can be challenging to support a >400 Mbps data rate or/and acceptable reliability using currently available sub-6 GHz spectrum.

Potential NR SL operations using the 60 GHz unlicensed band has received considerable attention due to its potential support of abundant GHz data links. Rel-17 has specified potential air interface (e.g., Uu interface) operations over this band (known as FR2x or FR2-2) which may open this band for NR SL operations. The various aspects of the present disclosure may provide relaxed sensing for Mode 2-based channel access for NR SL over mmW bands including FR2x/FR2-2, FR4, FR5, and the like.

For air interface operations over mmW bands, including FR2x/FR2-2, FR4, FR5, etc., both listen-before-talk (LBT)-based and no-LBT-based channel access may be supported, especially when LBT procedures are not mandated by a spectrum regulator. The more narrow beams that are often used at mmW bands do not always benefit from the legacy transmission-side LBT procedures. The reduced radio frequency (RF) footprint of the narrow beams may make interference less detrimental in general. Furthermore, the use of narrow beams generally may make what can be observed from the transmit-side LBT less relevant to the a true interference experienced at the receiver side. Consequently, transmit-side LBT may be re-positioned as a security measure to prevent persistent collisions that happen rarely in practice but, when they do happen, may impact system tail performance. Specifically, proposals have been introduced that exploit some level of long-term sensing (e.g., measured interference level, identification of other radio access technologies (RATs), and the like) to adaptively switch between LBT-based channel access and no-LBT-based channel access, together with any constraints on transmit beam width, duty cycle, beam dwell time, and the like.

Legacy Mode 2 sensing in the channel access process may be considered a transmit-side short-term sensing operation. Additionally, sensing operations have been recognized as a blocking factor for achieving low latency in Mode 2 channel access. Thus, in order to facilitate some unlicensed band use cases that prioritize low latency over tail performance, it may be beneficial to relax the legacy Mode 2 sensing procedures.

Figure 4:
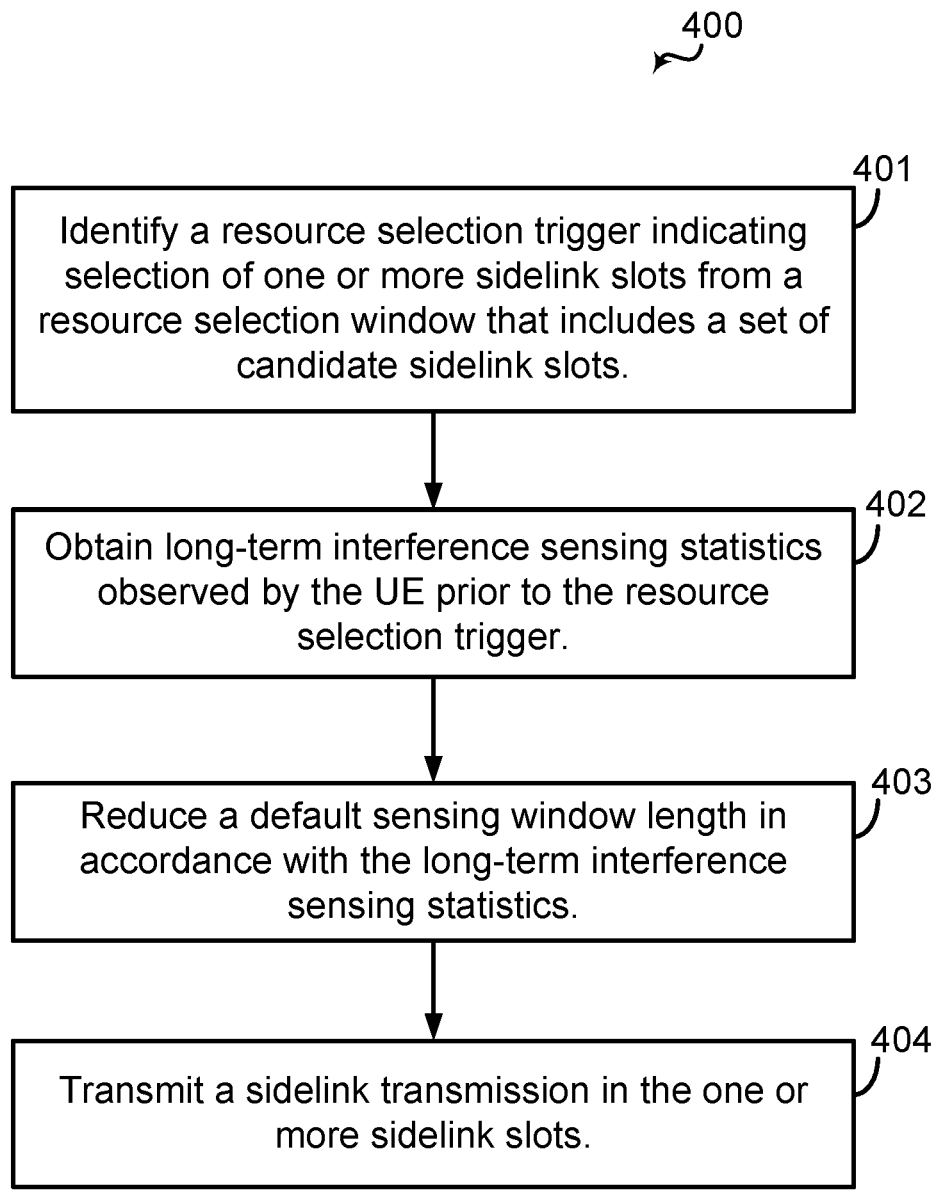
FIG. 4 is a block diagram illustrated example blocks of a process executed by a UE to provide relaxed sensing for NR sidelink over mmW operating frequencies according to one or more aspects of the present disclosure.

FIG. 4 is a block diagram illustrated example blocks of process 400 executed by a UE to provide relaxed sensing for NR sidelink over mmW operating frequencies according to one or more aspects of the present disclosure. Operations of process 400 may be performed by a UE, such as UE 115 described above with reference to FIG. 1-3, or 5-11. For example, example operations (also referred to as "blocks") of process 400 may enable UE 115 to support relaxed sensing for NR sidelink over mmW operating frequencies. The blocks of process 400 will also be described with respect to operations and functionality of UE 115, as described in FIG. 12.

Figure 12:
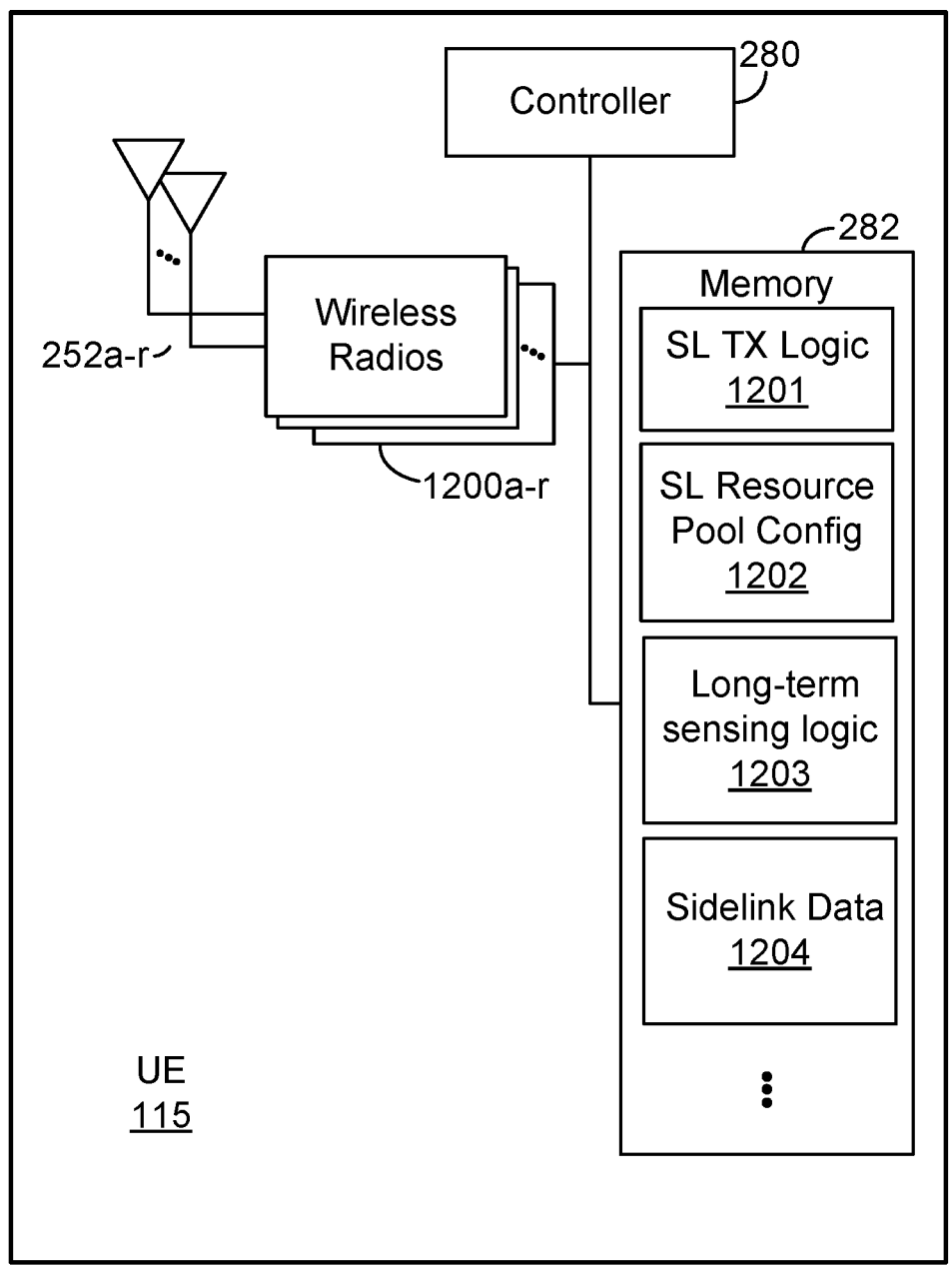
FIG. 12 is a block diagram of an example UE that supports enhanced beam management using XR perception data according to one or more aspects.

FIG. 12 is a block diagram of an example UE 115 that supports enhanced beam management using XR perception data according to one or more aspects. In some implementations, UE 115 includes the structure, hardware, and components shown and described with reference to UE 115 of FIGS. 1-2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 1200a-r and antennas 252a-r. Wireless radios 1200a-r include various components and hardware, as illustrated in FIG. 2 for UE 115, including modulator and demodulators 254a-r, MIMO detector 256, receive processor 258, transmit processor 264, and TX MIMO processor 266.

As shown, memory 282 may include sidelink transmission (TX) logic 1201, slidelink resource pool configuration 1202, long-term sensing logic 1203, and sidelink data 1204. sidelink TX logic 1101 may be configured to implement the functionality of sidelink communications at UE 115. Sidelink resource pool configuration 1202 may include the configuration of the resource pool available to UE 115 for sidelink communications, including available slots for sidelink communications as well as whether the resource pool supports periodic channel access procedures. Long-term sensing logic 1103 may be configured to provide the functionality of UE 115 to maintain statistics of sensing results over a historical period, such as historical statistics of self-requested HARQ responses and virtual collisions. UE 115 may receive signals from or transmit signals to one or more network entities, such as UEs 115b and 115c of FIGS. 1, 3, and 5-11.

At block 401, a UE identifies a resource selection trigger indicating selection of one or more sidelink slots from a resource selection window that includes a set of candidate sidelink slots of a plurality of available sidelink slots. A UE, such UE 115 may execute, under control of controller 280, sidelink TX logic 1201, stored in memory 282. The features and functionality implemented by execution of the code and instructions (referred to herein as the "execution environment") of sidelink TX logic 1201 provides UE 115 the capability for obtaining access to sidelink resources for sidelink transmissions. UE 115, within the execution environment of sidelink TX logic 1201, accesses the configuration information in memory 282 at sidelink resource pool configuration 1202. Upon detecting the resource selection trigger, UE 115 identifies the resource selection window with the set of candidate sidelink slots with the configuration information.

At block 402, the UE obtains long-term interference sensing statistics observed by the UE prior to the resource selection trigger. In operating in accordance with the aspects of the present disclosure, UE 115, within the execution environment of sidelink TX logic 1201, UE 115 further executes, under control of controller 280, long-term sensing logic 1203. The execution environment of long-term sensing logic 1203 allows UE 115 to compile long-term interference sensing statistics over a particular window of time. These statistics are stored in memory 282. The detection of the resource selection trigger will trigger UE 115 to access these statistics in memory 282. As noted above, the long-term interference sensing statistics may include self-requested HARQ response and/or a number of virtual collisions, as detected over a historical sensing period.

At block 403, the UE reduces a default sensing window length in accordance with the long-term interference sensing statistics. In the sidelink communication capability of UE 115, UE 115 may receive sidelink configuration information that provides, among other things, a default sensing window length. UE 115 receives such configuration via antennas 252a-r and wireless radios 1200a-r. Within the execution environment of sidelink TX logic 1201, UE 115 may use the long-term interference sensing statistics to determine whether to reduce the length of the sensing window for a given access attempt. Where the long-term interference sensing statistics indicate lower detected interference in such resources, UE 115 may reduce the length of the sensing window.

At block 404, the UE transmits a sidelink transmission in the one or more sidelink slots. After reducing the sensing window, UE 115 may use sidelink data 1204 in memory 282 to perform sidelink transmissions on the shared communication channel. UE 115 transmits data from sidelink data 1204 via wireless radios 1200a-r and antennas 252a-r.

In some aspects, the present disclosure provides techniques for adaptive reduction of a default sensing window length for autonomous sidelink transmission by a transmit (TX) sidelink UE. By adaptively reducing the length of the sensing window, including to a length of 0 for no-sensing, using historical interference sensing statistics, battery power for battery-powered UEs may be conserved. Additionally, the potential latency time for accessing a shared communication channel for sidelink transmissions may be reduced.

Figure 5:
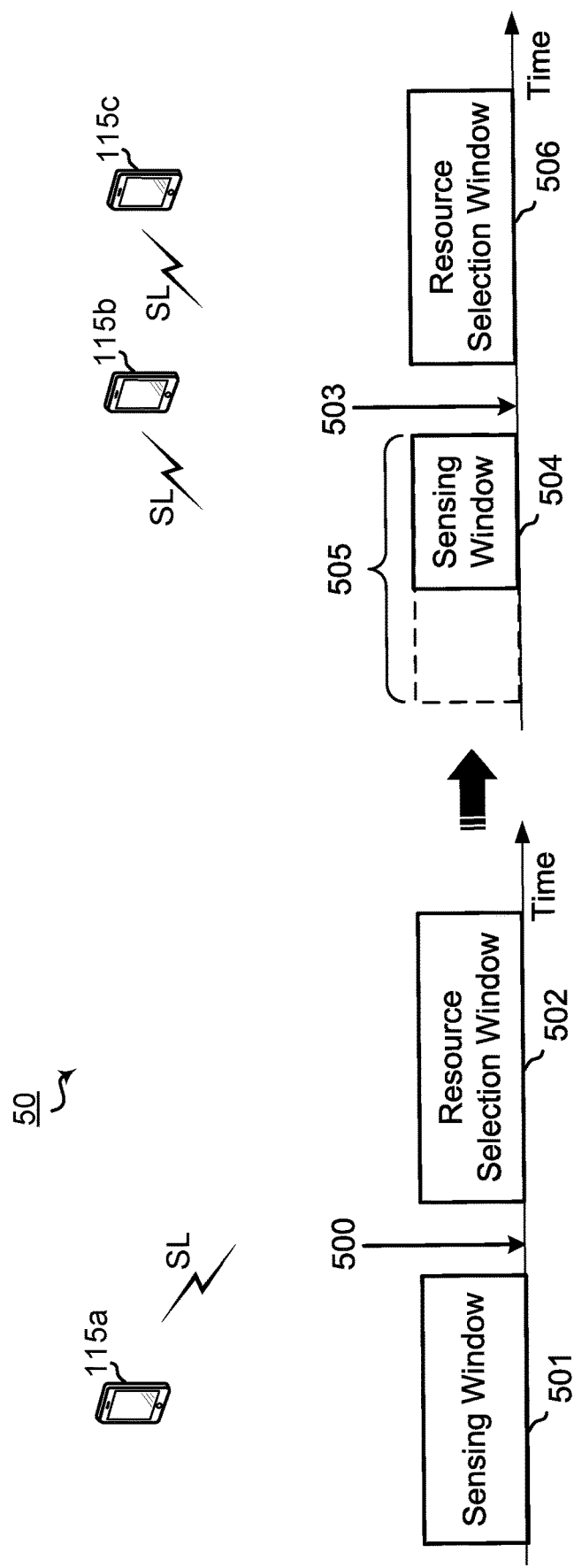
FIG. 5 is a block diagram illustrating a UE within a wireless network configured to provide relaxed sensing for NR sidelink over mmW operating frequencies according to one or more aspects of the present disclosure.

FIG. 5 is a block diagram illustrating a UE 115a within a wireless network 50 configured to provide relaxed sensing for NR sidelink over mmW operating frequencies according to one or more aspects of the present disclosure. UE 115a may conduct sidelink transmissions using Mode 2 channel access to various network entities, such as UEs 115b and 115c. According to the aspects described herein, when operating in a mmW band (e.g., FR2x/FR2-2, FR4, FR5, and the like), a Mode 2 UE can be allowed to adaptively reduce the length, including to a zero-length, of the sensing window based upon outer-loop/long-term sensing outcomes for pending sidelink transmissions (e.g., PSCCH/PSSCH).

In defining Mode 2 access for sidelink communications, Rel-16 provided a fixed-length sensing window for the TX sidelink UE. The outer-loop/long-term sensing outcomes can be the interference related statistics of self-requested hybrid automatic receipt request (HARQ) responses and/or instances of virtual collisions obtained in historical operations over a specific set of beam spaces related to the pending sidelink transmissions. Virtual collisions may occur when a TX sidelink UE selects a resource and, when conducting the re-evaluation procedure prior to transmission, determines the selected resource is no longer available. Each such determination of unavailability upon re-evaluation may be considered a virtual collision. The combination of outer-loop/long-term sensing outcomes as either or both of the self-requested HARQ responses and virtual collisions will be referred to herein as long-term interference sensing statistics. The TX sidelink UE may use these historical, long-term interference sensing statistics when determining to adaptively reduce the length of the sensing window.

Within wireless network 50 TX sidelink UE, UE 115a, may perform Mode 2 channel access for sidelink transmissions over a shared communication channel. UE 115a detects resource selection trigger 500 in preparation for sidelink transmission. UE 115a may then sense for any interference on the shared communication channel during sensing window 501. UE 115a then selects one or more available resources within resource selection window 502. During this channel access process triggered by resource selection trigger 500, UE 115a may collect and save indications of self-requested HARQ responses, virtual collisions, and the like as long-term interference sensing statistics. In a future access procedure triggered by resource selection trigger 503, UE 115a may use the long-term interference sensing statistics to adaptively reduce the default sensing window length 505 to the reduced length of sensing window 504. UE 115a would then select one or more resources in resource selection window 506. With this next access process, UE 115a may continue to collect further long-term interference sensing statistics for later sidelink transmission attempts or sensing occasions, such as initial sensing, re-evaluation/pre-emption detection, and the like.

In additional aspects, UE 115a may trigger reduction of the default sensing window length in response to the features of the pending sidelink transmission. The pending sidelink transmission can be specified via features such as transmission beam width, duty cycle, transmit power, same-beam dwelling duration, payload priority, and the like. Thus, UE 115a can determine to reduce the default sensing window length in response to a particular feature (e.g., beam width, duty cycle, dwell time, power, priority, etc.), in addition to the long-term interference sensing statistics.

Figure 6:
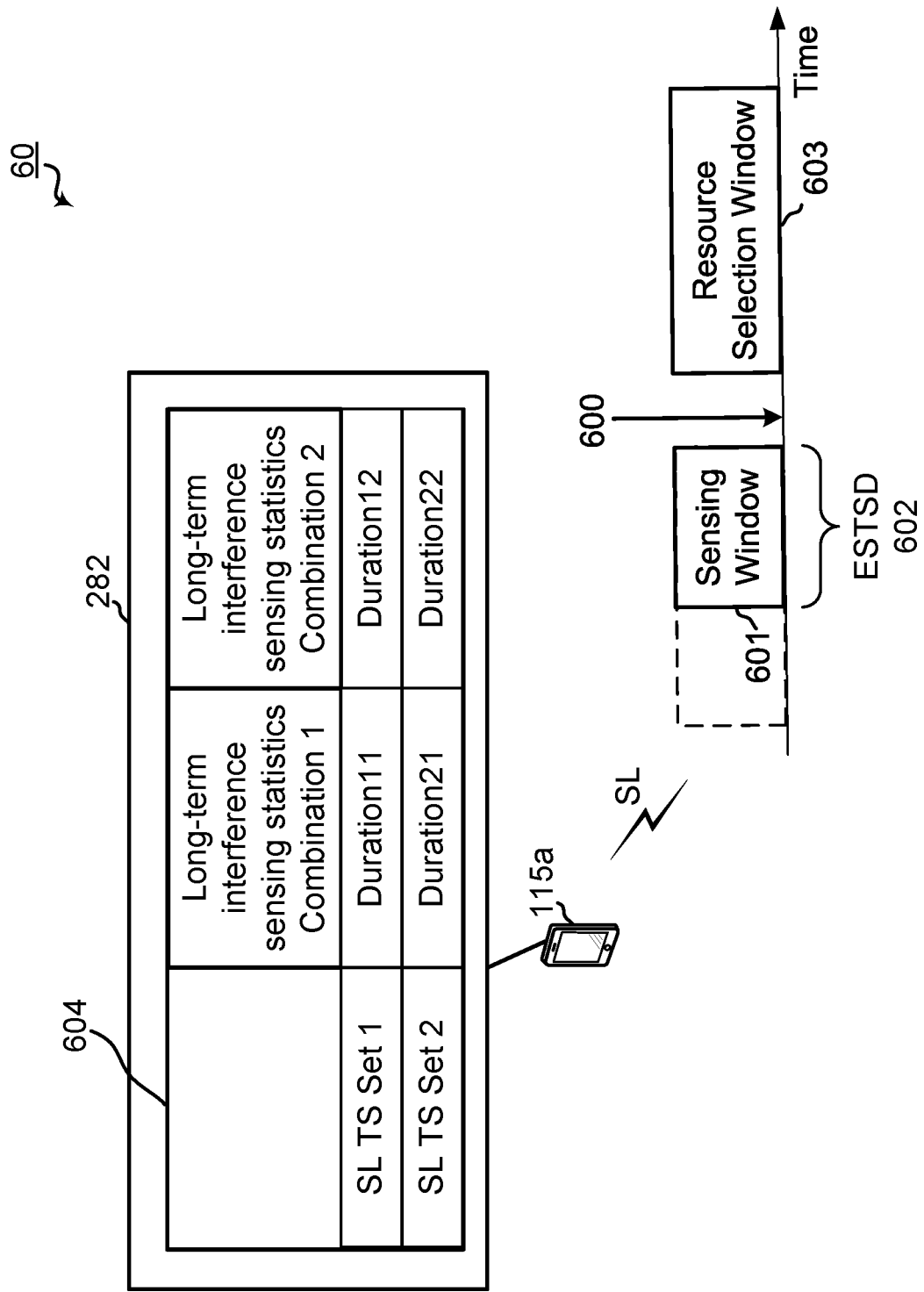
FIG. 6 is a block diagram illustrating a UE within a wireless network configured to provide relaxed sensing for NR sidelink over mmW operating frequencies according to one or more aspects of the present disclosure.

FIG. 6 is a block diagram illustrating a UE 115a within a wireless network 60 configured to provide relaxed sensing for NR sidelink over mmW operating frequencies according to one or more aspects of the present disclosure. As indicated with respect to FIG. 5, UE 115a may conduct sidelink transmissions using Mode 2 channel access to various network entities, such as UEs 115b and 115c. According to the aspects described herein, when operating in a mmW band a Mode 2 UE, such as UE 115a, can be allowed to adaptively reduce the length, including to a zero-length, of the sensing window in accordance with different combinations of long-term interference sensing statistics and sidelink transmission features.

As noted above, the adaptively shortened sensing window length may also be a function of a combination of the nature of one or more of the sidelink transmission features and the long-term interference sensing statistics. For example, the nature of the sidelink transmission features may include the pending sidelink transmission to be transmitted over a transmit beam whose width is smaller than a predetermined beam width threshold. This may include the aggregate beam width when more than two layers are to be transmitted. The nature of the sidelink transmission features may further include: the transmit duty cycle of UE 115a is lower than a predetermined duty cycle threshold; the beam via which the sidelink transmission is to be transmitted has a beam-specific duty cycle from UE 115a is lower than a beam-specific duty cycle threshold; the beam via which the sidelink transmission is to be transmitted has a dwelling time within a moving window of UE 115a that is lower than a dwelling time threshold; the transmit power of the sidelink transmission is lower than a predetermined power threshold; or the payload of the sidelink transmission has a priority that is higher than a priority threshold.

It should be noted that, the features identified by a pending transmit beam may include a pending set of clustered beams clustered along the same boresight direction.

FIG. 6 identifies an example implementation for reduction of the default sensing window length in accordance with different combinations of long-term interference sensing statistics and pending sidelink transmission features. A set of effective short-term sensing durations (ESTSDs) may be mapped to the different combinations of long-term interference sensing statistics and sidelink transmission features. This set of ESTSDs may be stored in an ESTSD table 604 in memory 282 of UE 115a indexed by long-term interference sensing statistics and sidelink transmission features. For example, ESTSD table 604 includes two reduced durations (Duration 11 and Duration 12) for the sidelink transmission feature set, SL TS Set 1, indicated by long-term interference sensing statistics combination 1 (Duration 11) and long-term interference sensing statistics combination 2 (Duration 12). It also includes to reduced durations (Duration 21 and Duration 22) for the sidelink feature set, SL TS Set 6, indicated by long-term interference sensing statistics combination 1 (Duration 21) and long-term interference sensing statistics combination 2 (Duration 22).

In response to resource selection trigger 600, UE 115a identifies the combination of long-term interference sensing statistics and the particular set of sidelink transmission features for the pending sidelink transmission and identifies the ESTSD associated with this combination from ESTSD table 604. UE 115a sets the duration of sensing window 601 to selected ESTSD 602. Depending on the combination of long-term interference sensing statistics and sidelink transmission features, ESTSD 602 may be set to Duration11, Duration12, Duration21, or Duration22. UE 115a may perform sensing during sensing window 601 before selecting one or more available resources within resource selection window 603.

It should be noted that, while not to scale, one of Duration11, Duration12, Duration21, or Duration22 may be a 0 length, in which ESTSD 602 is 0 and UE 115a would not perform sensing before selecting one or more sidelink resources in resource selection window 603.

Figure 7:
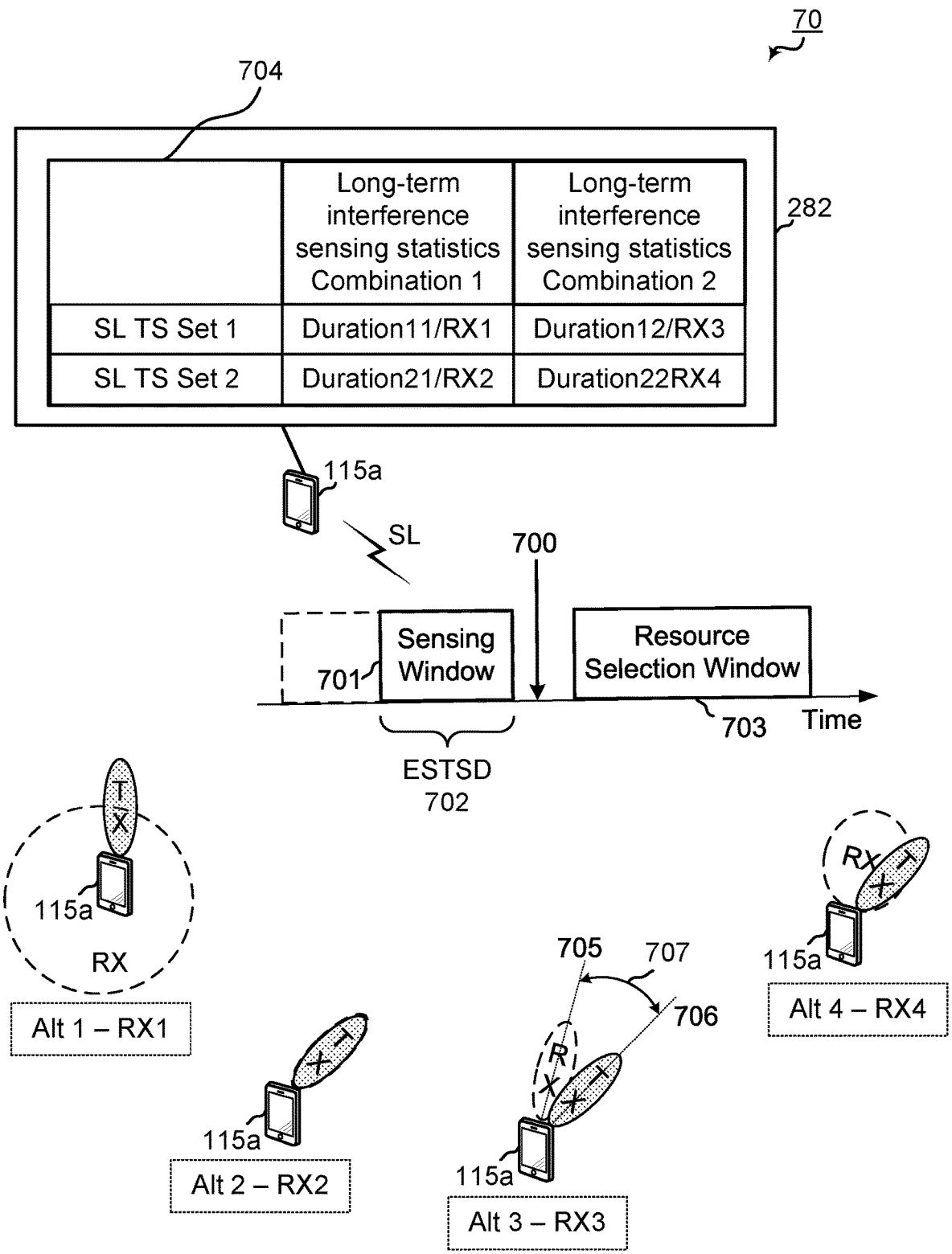
FIG. 7 is a block diagram illustrating a UE within a wireless network configured to provide relaxed sensing for NR sidelink over mmW operating frequencies according to one or more aspects of the present disclosure.

FIG. 7 is a block diagram illustrating a UE 115a within a wireless network 70 configured to provide relaxed sensing for NR sidelink over mmW operating frequencies according to one or more aspects of the present disclosure. As indicated with respect to FIGS. 5 and 6, UE 115a may conduct sidelink transmissions using Mode 2 channel access to various network entities, such as UEs 115b and 115c, and be allowed to adaptively reduce the length of the sensing window in accordance with different combinations of long-term interference sensing statistics and sidelink transmission features and an indication of a corresponding receive beam for performing the short-term sensing.

UE 115a includes ESTSD table 704, stored in memory 282. ESTSD table 704 not only reflects a set of ESTSDs, Duration11, Duration12, Duration21, or Duration22, indexed by long-term interference sensing statistics combination and set of sidelink transmission features, but also identifies a corresponding receive beam (RX1-RX4) for UE 115a to use for performing the short-term sensing or SCI decoding. In response to resource selection trigger 700, UE 115a identifies the combination of long-term interference sensing statistics and the particular set of sidelink transmission features for the pending sidelink transmission and identifies the ESTSD associated with this combination from ESTSD table 704. UE 115a sets the duration of sensing window 701 to selected ESTSD 702. Depending on the combination of long-term interference sensing statistics and sidelink transmission features, ESTSD 702 may be set to Duration11, Duration12, Duration21, or Duration22. However, with each ESTSD within ESTSD table 704, a specific receive beam (RX1-RX4) is identified. UE 115a may then perform sensing along the direction of the receive beam corresponding to ESTSD 702 during sensing window 701 before selecting one or more available resources within resource selection window 703.

In an example of each corresponding receive beam, when RX1 is associated with ESTSD 702, UE 115a, in Alt 1-RX1, may use an omnidirection receive beam (RX1). When RX2 is associated with ESTSD 702, UE 115a, in Alt2-RX2, may use a receive beam (RX2) in the same direction as the transmit beam of the pending sidelink transmission. When RX3 is associated with ESTSD 702, UE 115a, in Alt3-RX3, may use a receive beam (RX3) with a boresight direction 705 that is within a predetermined distance 707 from a boresight direction 706 of the transmit beam (TX). When RX4 is associated with ESTSD 702, UE 115a, in Alt4-RX4, may use a receive beam (RX4) that has a wider beam width than the width of the transmit beam (TX).

It should be noted that the beam associated with ESTSD 702 may further include a combination of any of the RX3 beam and RX4 beam, a combination of any of RX1-RX4 beams, or any available receive beam.

Figure 8:
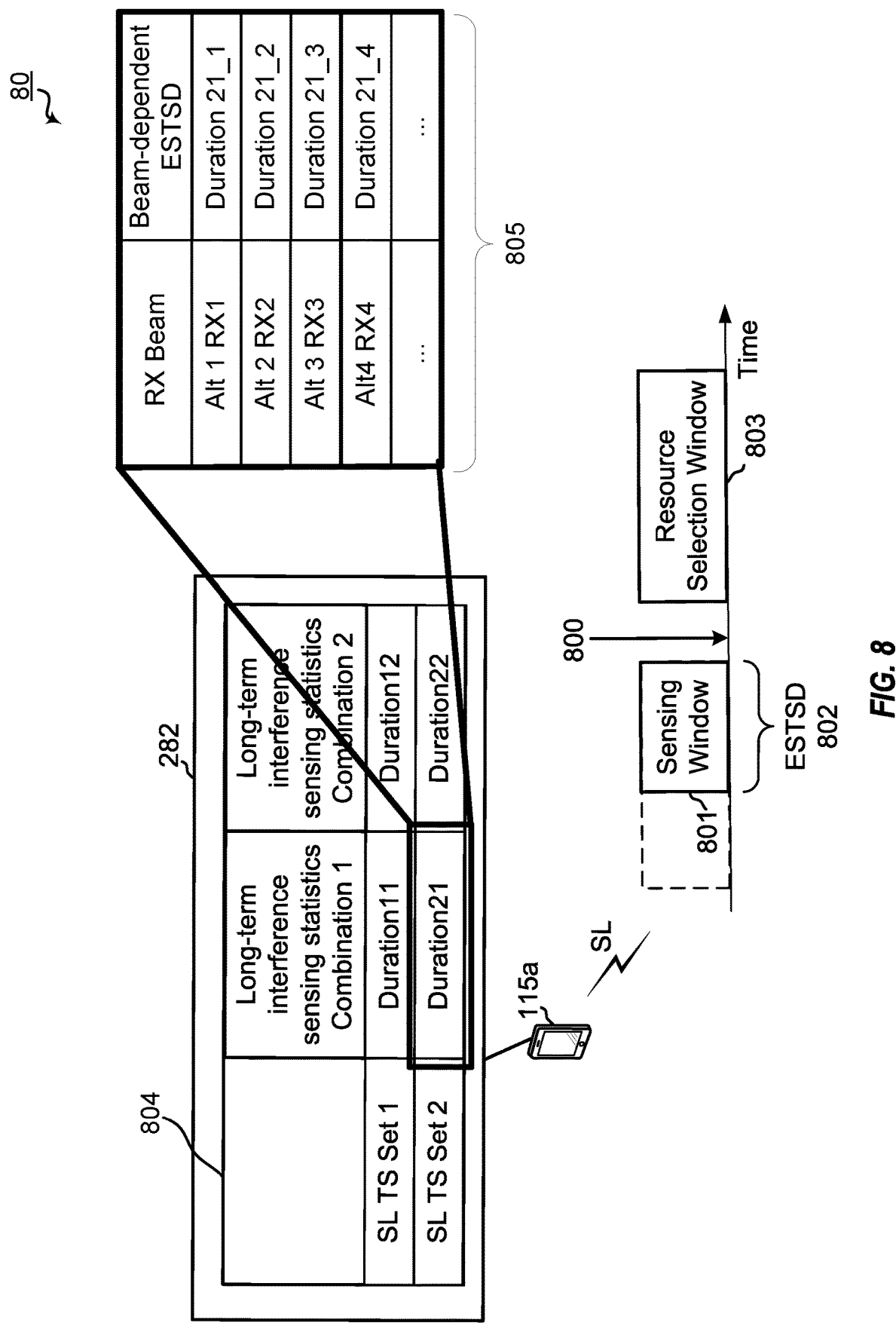
FIG. 8 is a block diagram illustrating a UE within a wireless network configured to provide relaxed sensing for NR sidelink over mmW operating frequencies according to one or more aspects of the present disclosure.

FIG. 8 is a block diagram illustrating a UE 115a within a wireless network 80 configured to provide relaxed sensing for NR sidelink over mmW operating frequencies according to one or more aspects of the present disclosure. As indicated with respect to FIGS. 5-7, UE 115a may conduct sidelink transmissions using Mode 2 channel access to various network entities, such as UEs 115b and 115c, and be allowed to adaptively reduce the length of the sensing window in accordance with different combinations of long-term interference sensing statistics, the sidelink transmission features, and an indicated receive beam for performing the short-term sensing.

UE 115a includes ESTSD table 804, stored in memory 282. ESTSD table 804 8 reflects a set of ESTSDs, Duration11, Duration12, Duration21, or Duration22, indexed by long-term interference sensing statistics combination and set of sidelink transmission features. However, according to the aspect illustrated in FIG. 8, each ESTSD, Duration11, Duration12, Duration21, or Duration22, will itself include a number of alternative receive beams (RX1-RX4), where the particular receive beam will correspond to a different beam-specific ESTSD. Sub-table 805 represents the alternatives available for Duration21, which is indexed by SL TS Set 2 and long-term interference sensing statistics Combination 1. For Alt 1 RX1, the corresponding ESTSD is Duration21_1; for Alt 2 RX2, the corresponding ESTSD is Duration21_2; for Alt3 RX3, the corresponding ESTSD is Duration21_3; and for Alt4 RX4, the corresponding ESTSD is Duration21_4.

In response to resource selection trigger 800, UE 115a identifies the combination of long-term interference sensing statistics and the particular set of sidelink transmission features for the pending sidelink transmission and identifies the ESTSD associated with this combination from ESTSD table 804. UE 115a sets the duration of sensing window 801 to selected ESTSD 802. UE 115a may select the receive beam for use with the pending sidelink transmission from sub-table 805. Such a selection may be made based on a number of different criteria, including an indication of the available receive beams, known directions of the sidelink transmission, and the like. Depending on which receive beam (RX1-RX4) is selected, the corresponding ESTSD (Duration21_1-Duration21_4) will be set for ESTSD 802.

Figure 9:
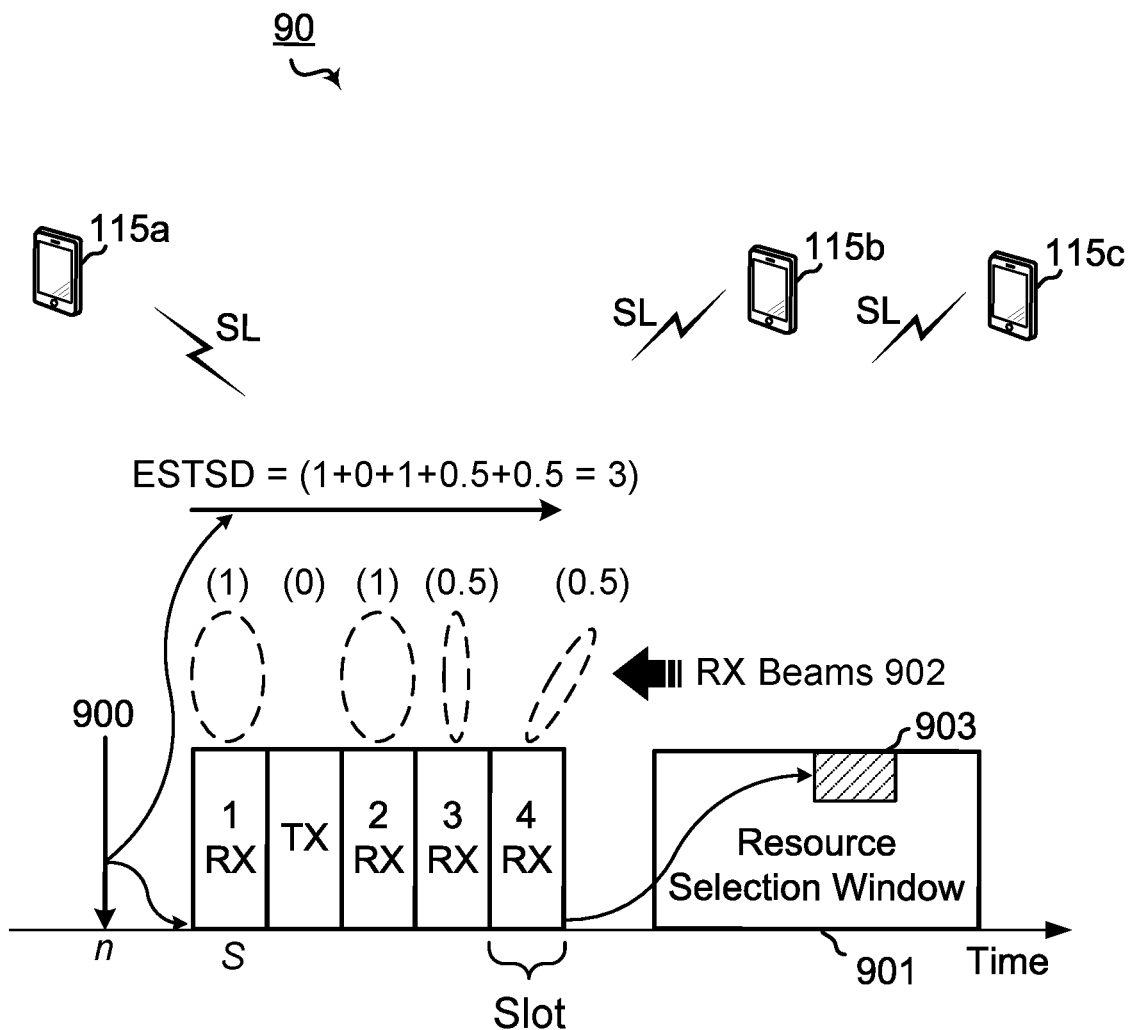
FIG. 9 is a block diagram illustrating a UE within a wireless network configured to provide relaxed sensing for NR sidelink over mmW operating frequencies according to one or more aspects of the present disclosure.

FIG. 9 is a block diagram illustrating a UE 115a within a wireless network 90 configured to provide relaxed sensing for NR sidelink over mmW operating frequencies according to one or more aspects of the present disclosure. As indicated with respect to FIGS. 5-8, UE 115a may conduct sidelink transmissions using Mode 2 channel access to various network entities, such as UEs 115b and 115c, and be allowed to adaptively reduce the length of the sensing window.

Instead of providing alternative receive beams and beam-dependent lengths for each ESTSD in an ESTSD table indexed by different combinations of long-term interference sensing statistics and the sidelink transmission features of the sidelink transmission, UE 115a can be allowed to count the number of slots in receiving mode using different receive beams for the ESTSD length. Specifically, UE 115a may apply a weighting factor corresponding to selected receive beam width in accumulating the number of slots to equal the ESTSD length. Resource selection trigger 900, at slot n, allows UE 115a to determine that the sensing window starts from slot S and determines, based on the combinations of long-term interference sensing statistics and the sidelink transmission features of the sidelink transmission, an ESTSD of 3. Over the next five slots available for the sensing window, three slots (1 RX-4 RX) are in a receiving mode and one slot (TX) is in transmitting mode. Receive beams 902 reflect the receive beams used by UE 115*a* within the receiving mode slots, 1 RX-4 RX.

UE 115*a* performs sensing at 1 RX using a wide beam for receive beam 902 at slot S, performs transmission at the (S+1)-slot, performs sensing at 2 RX using a wide beam for receive beam 902, and performs sensing at 3 RX and 4 RX using a relatively narrow receive beam for receive beams 902. Sensing is typically less effective at narrow beams than in wider beams. Therefore, the sensing slots with the relatively narrow receive beam may be counted using a lower weighting factor than the sensing slots with the wider beams. As illustrated, when receive beams 902 are the wider receive beams, at 1 RX and 2 RX, the count may be weighted at 1, and when the receive beams 902 are the relatively narrow receive beams, at 3 RX and 4 RX, the count may be weighted at 0.5. Consequently, in order to count slots to the ESTSD length, UE 115*a* counts each of the sensing slots, at 1 RX-4 RX, to result in the determined ESTSD of 3 (e.g., 1+0+1+0.5+0.5=3). After sensing is completed after the slot count equals ESTSD, UE 115*a* may then select resource 903 from resource selection window 901.

Figure 10A:
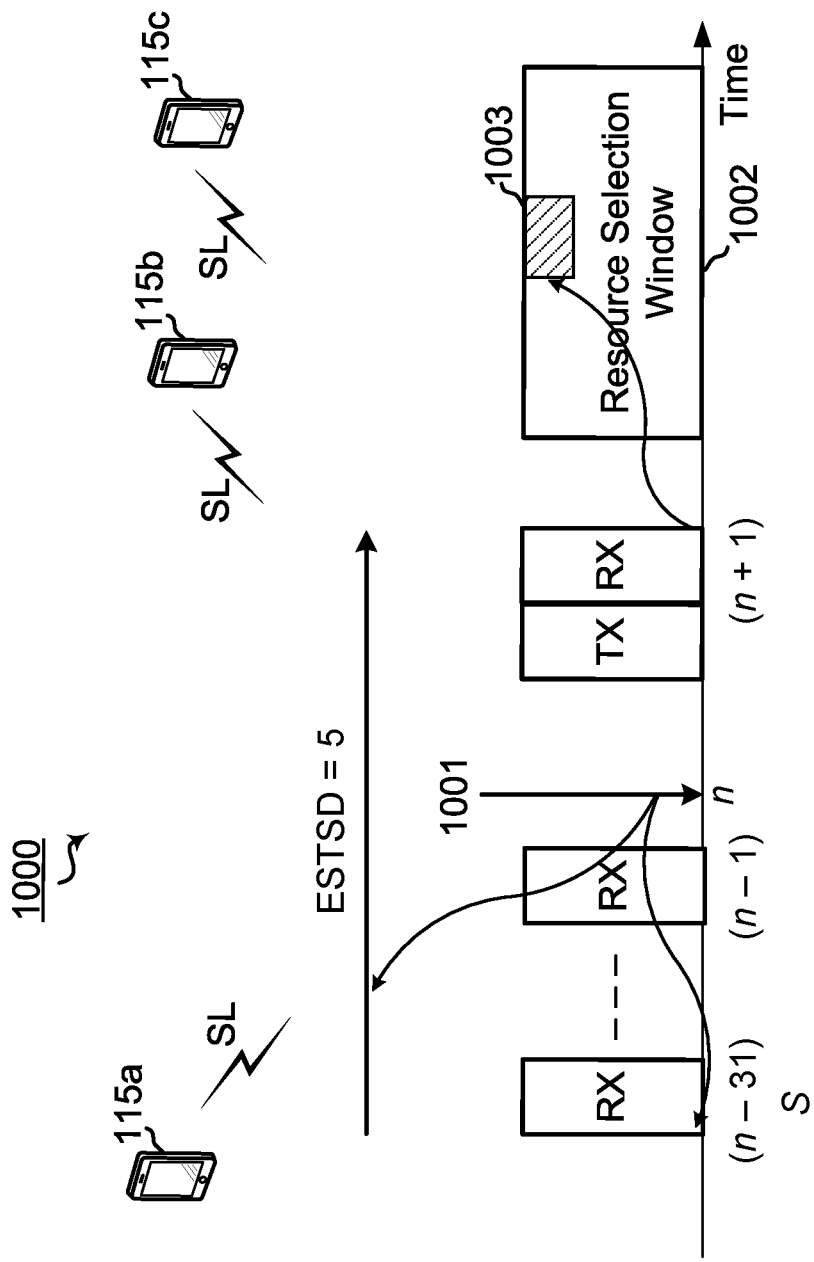
FIGS. 10A and 10B are block diagrams illustrating a UE within a wireless network configured to provide relaxed sensing for NR sidelink over mmW operating frequencies according to one or more aspects of the present disclosure.

FIG. 10A is a block diagram illustrating a UE 115*a* within a wireless network 1000 configured to provide relaxed sensing for NR sidelink over mmW operating frequencies according to one or more aspects of the present disclosure. As indicated with respect to FIGS. 5-9, UE 115*a* may conduct sidelink transmissions using Mode 2 channel access to various network entities, such as UEs 115*b* and 115*c*, and be allowed to adaptively reduce the length of the sensing window. Resource selection trigger 1001, at slot n, allows UE 115*a* to determine, based on the combinations of long-term interference sensing statistics and the sidelink transmission features of the sidelink transmission, an ESTSD of 5. As illustrated, the sidelink resource pool available for sidelink transmissions does not support periodic channel access.

In addition to weighting sensing results in accordance with beam width, the length into the history of sensing occasions may be gated based on the capability of a legacy SCI in making a time domain reservation. This time is predetermined and known to the sidelink UEs, such as UEs 115*a*-115*c*. For example, the legacy SCI is capable of reserving slots up to 31 slots from resource selection trigger 1001. In such case, when reviewing historical sensing slots that may be applicable in accumulating an ESTSD, UE 115*a* may look back to S defined at (n−31). Consequently, in order to count slots to the ESTSD length, UE 115*a* counts each of the sensing slots, back to S as (n−31), to result in the determined ESTSD of 5. After counting of the applicable sensing occasions is completed after the slot count equals ESTSD, UE 115*a* may then select resource 1003 from resource selection window 1002.

Figure 10B:
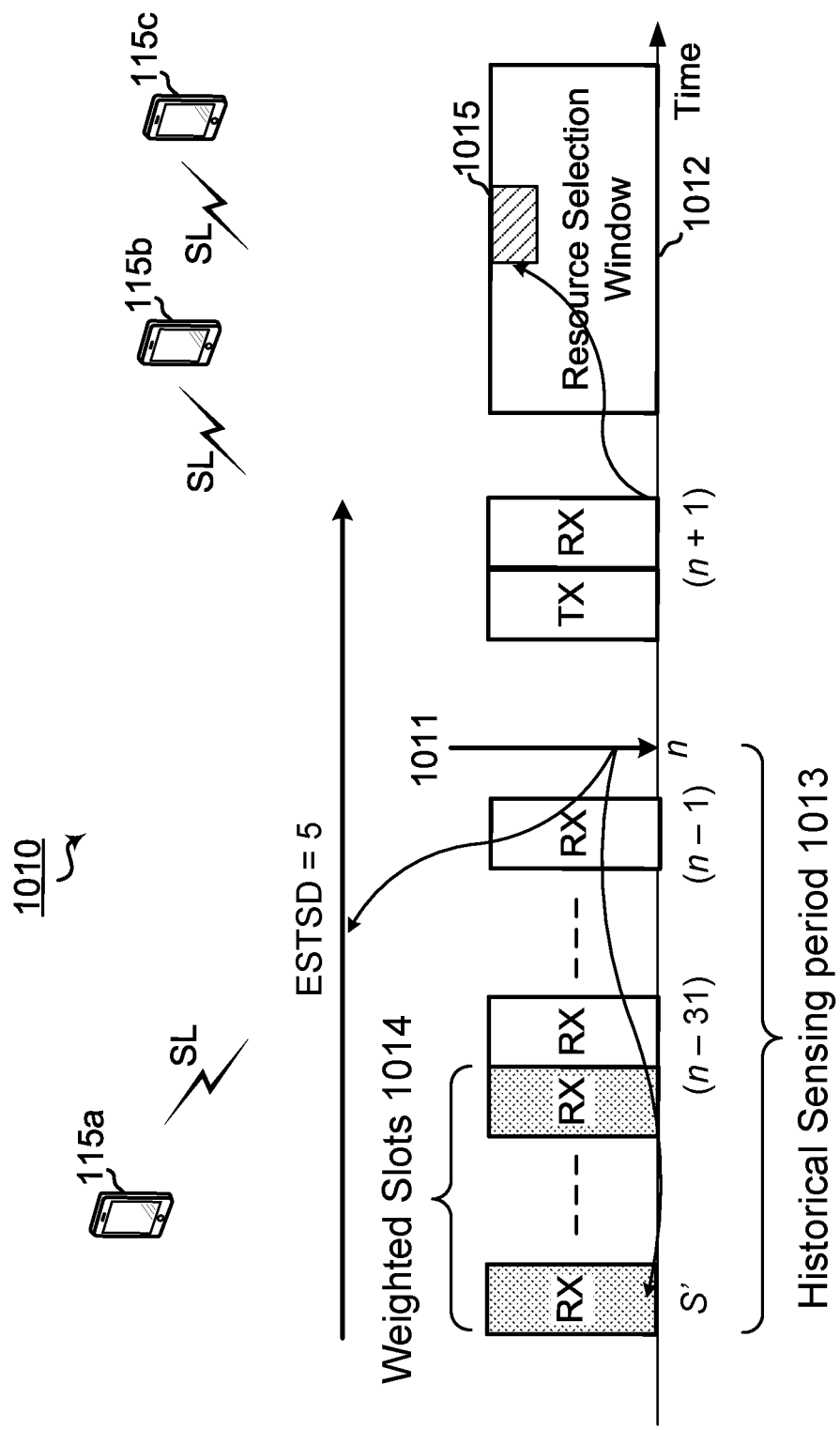

FIG. 10B is a block diagram illustrating a UE 115*a* within a wireless network 1010 configured to provide relaxed sensing for NR sidelink over mmW operating frequencies according to one or more aspects of the present disclosure. As indicated with respect to FIGS. 5-10A, UE 115*a* may conduct sidelink transmissions using Mode 2 channel access to various network entities, such as UEs 115*b* and 115*c*, and be allowed to adaptively reduce the length of the sensing window. Resource selection trigger 1011, at slot n, allows UE 115*a* to determine, based on the combinations of long-term interference sensing statistics and the sidelink transmission features of the sidelink transmission, an ESTSD of 5. As illustrated, the sidelink resource pool available for sidelink transmissions supports periodic channel access.

With the support of periodic channel access, the historical period within which sensing occasions may be reviewed for accumulating ESTSD length may be extended to set the first slot of the sensing window (S') to be a set time length from the resource selection trigger 1011, n, (e.g., 100 ms-1100 ms). Because of the historic nature of the sensing occasions, the longer of time from resource selection trigger 1011, the higher a potential that the same conditions no longer exist. The more recent sensing occasions may result in a higher potential that the same conditions do exist. In order to accommodate this relationship, UE 115*a* may apply a less-than-one weighting factor for the historical sensing occasions between n−31 and S'. Thus, in accumulating sensing results for ESTSD length, UE 115*a* may include counting of sensing results n−31 to n+1, and also counting sensing results within historical sensing period 1013 for those occasions between n−32 and S'. These sensing occasions, within weighted slots 1014, are accumulated by UE 115*a* using the less-than-one weighting factor. After counting of the applicable sensing occasions is completed after the slot count equals ESTSD, UE 115*a* may then select resource 1015 from resource selection window 1012.

Figure 11:
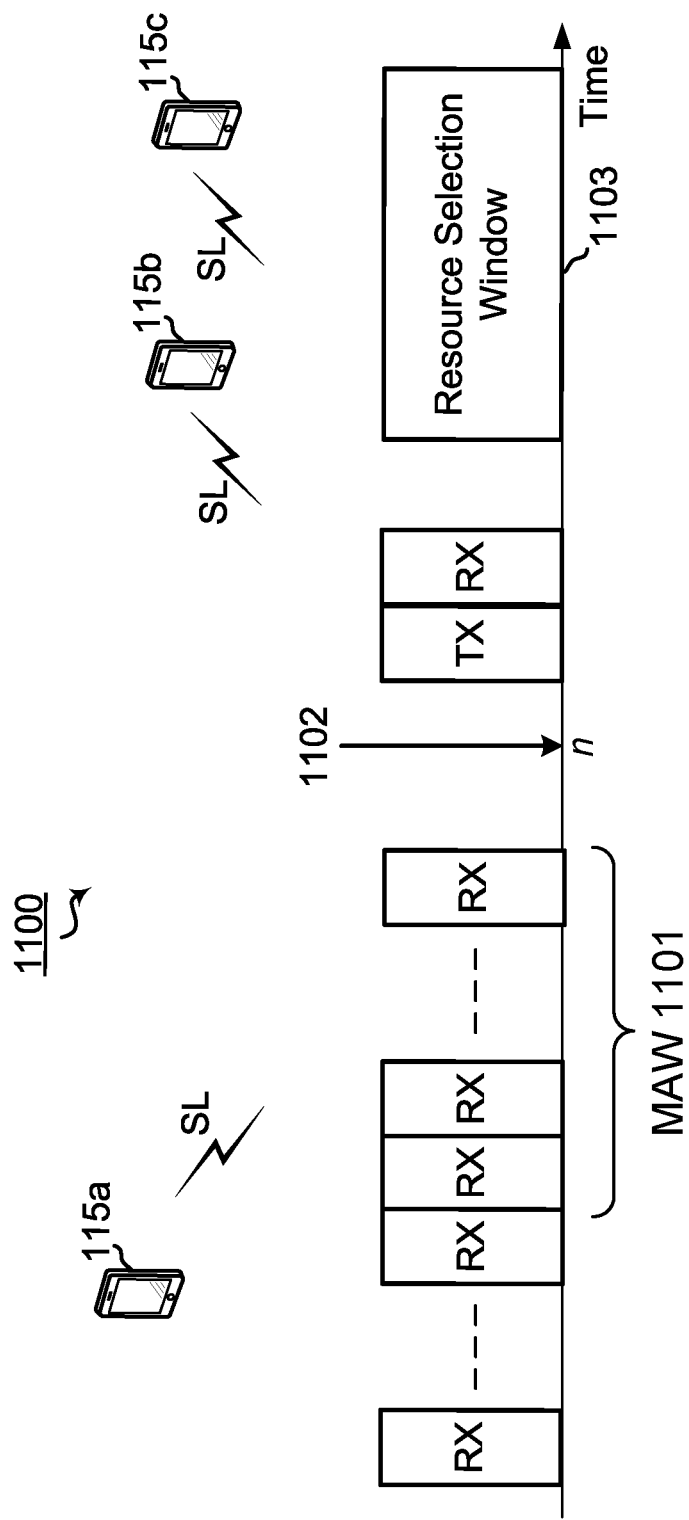
FIG. 11 is a block diagram illustrating a UE within a wireless network configured to provide relaxed sensing for NR sidelink over mmW operating frequencies according to one or more aspects of the present disclosure.

FIG. 11 is a block diagram illustrating UE 115*a* within a wireless network 1100 configured to provide relaxed sensing for NR sidelink over mmW operating frequencies according to one or more aspects of the present disclosure. As indicated with respect to FIGS. 5-10B, UE 115*a* may conduct sidelink transmissions using Mode 2 channel access to various network entities, such as UEs 115*b* and 115*c*, and be allowed to adaptively reduce the length of the sensing window. As indicated above, the long-term interference sensing statistics may be obtained by UE 115*a* from previous self-requested HARQ responses collected over a moving-average window (MAW) 1101. Specifically, for a sideline transmission to be transmitted over a specific transmit beam, UE 115*a* can be configured to maintain the HARQ response statistics that UE 115*a* collected over any of: the same transmit beam to the same receiving UE(s), such as UEs 115*b* and 115*c*, within MAW 1101; the same transmit beam towards any receive UE(s) within MAW 1101; any transmit beam whose boresight direction is within a specified range centered at that of the transmit beam under consideration to any receive UE(s) within MAW 1101; any beam towards the same receive UE(s) within MAW 1101; or any transmit beam within MAW 1101. In essence, the sensing window length can be increased with each negative acknowledgement (NAK) or discontinuous transmission (DTX), or decreased with each positive acknowledgement (ACK).

The long-term interface sensing statistics may also be obtained by UE 115*a* by counting the number of virtual collision in a MAW, such as MAW 1101. Referring back to FIG. 3, when UE 115*a* performs initial sensing, UE 115*a* may select a sidelink resource within resource selection window 302 at the m-th slot of sensing window 301 for channel access. When perform re-evaluation prior to transmission, Ts before the first slot selected for transmission, UE 115*a* may identify that the selected resource is no longer available. The selected resource may have been pre-empted by a higher priority reservation or be suffering a collision from a same priority reservation or be suffering from another collision of transmission. In either case, a virtual collision occurs. A virtual collision may also happen in the re-evaluation process with respect to an over-the-air (OTA) reserved resource. Thus, for a pending sidelink transmission to be transmitted over a specific transmit beam, UE 115*a* can be configured to use virtual collision statistics collected over any beam option indicated with respect to collection of the self-requested HARQ responses above.

It is noted that one or more blocks (or operations) described with reference to FIG. 4 may be combined with one or more blocks (or operations) described with reference to another of the figures. For example, one or more blocks (or operations) of FIG. 5 may be combined with one or more blocks (or operations) of FIG. 6. As another example, one or more blocks associated with FIG. 5 may be combined with one or more blocks associated with FIGS. 7-10B. As another example, one or more blocks associated with FIG. 4 may be combined with one or more blocks (or operations) associated with FIGS. 1-3. Additionally, or alternatively, one or more operations described above with reference to FIGS. 1-3 may be combined with one or more operations described with reference to FIG. 12.

In one or more aspects, techniques for supporting relaxed sensing for NR sidelink over mmW operating frequencies may include additional aspects, such as any single aspect or any combination of aspects described below or in connection with one or more other processes or devices described elsewhere herein. In one or more aspects, supporting relaxed sensing for NR sidelink over mmW operating frequencies may include a UE configured to identify a resource selection trigger indicating selection of one or more sidelink slots from a resource selection window that includes a set of candidate sidelink slots of a plurality of available sidelink slots. The UE may obtain long-term interference sensing statistics observed by the UE prior to the resource selection trigger and reduce a default sensing window length in accordance with the long-term interference sensing statistics. The UE may then transmit a sidelink transmission in the one or more sidelink slots.

Additionally, the UE may perform or operate according to one or more aspects as described below. In some implementations, the UE may include at least one processor, and a memory coupled to the processor. The processor may be configured to perform operations described herein with respect to the apparatus. In some other implementations, the UE may include a non-transitory computer-readable medium having program code recorded thereon and the program code may be executable by a computer for causing the computer to perform operations described herein with reference to the apparatus. In some implementations, the UE may include one or more means configured to perform operations described herein. In some implementations, a method of wireless communication may include one or more operations described herein with reference to the UE.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication performed by a UE may include identifying, by the UE, a resource selection trigger indicating selection of one or more sidelink slots from a resource selection window that includes a set of candidate sidelink slots of a plurality of available sidelink slots; obtaining, by the UE, long-term interference sensing statistics observed by the UE prior to the resource selection trigger; reducing, by the UE, a default sensing window length in accordance with the long-term interference sensing statistics; and transmitting, by the UE, a sidelink transmission in the one or more sidelink slots.

In a second aspect, alone or in combination with the first aspect, wherein the reducing the default sensing window length is further in accordance with a combination of one or more features identified for the sidelink transmission, wherein the one or more features includes one or more of: a transmit beam, over which the sidelink transmission is to be transmitted, with a beam width less than a beam width threshold; a transmission duty cycle of the UE that is lower than a duty cycle threshold; a beam-specific transmission duty cycle that is lower than a beam-specific duty cycle threshold; a dwelling time of the transmit beam over a predetermined sliding window is lower than a dwelling time threshold; a transmit power lower than a power threshold; and a payload of the sidelink transmission, wherein the payload has a priority level greater that a priority threshold.

In a third aspect, alone or in combination with one or more of the first aspect or the second aspect, wherein the transmit beam includes one of: a single transmit beam; or a set of clustered beams clustered at a same boresight direction.

In a fourth aspect, alone or in combination with one or more of the first aspect through the third aspect, wherein the reducing the default sensing window length includes: identifying a reduction combination of long-term interference sensing statistics and the combination of the one or more features of the sidelink transmission; and selecting a reduced sensing window duration from a predetermined set of effective short-term sensing durations, wherein each duration of the predetermined set of effective short-term sensing durations is indexed according to the reduction combination.

In a fifth aspect, alone or in combination with one or more of the first aspect through the fourth aspect, wherein the each duration of the predetermined set of effective short-term sensing durations is further associated with a corresponding receive beam for sensing over the reduced sensing window.

In a sixth aspect, alone or in combination with one or more of the first aspect through the fifth aspect, wherein the corresponding receive beam includes any combination of one or more of: a receive beam corresponding to the transmit beam; the receive beam with a boresight direction within a predetermined range of the boresight direction of the transmit beam; or the receive beam with a beam width greater than the beam width of the transmit beam.

In a seventh aspect, alone or in combination with one or more of the first aspect through the sixth aspect, wherein the each duration of the predetermined set of effective short-term sensing durations includes one or more alternative durations corresponding to the corresponding receive beam for sensing over the reduced sensing window; and wherein the selecting the reduced sensing window duration includes selecting an alternative duration of the one or more alternative durations corresponding to the corresponding receive beam.

In an eighth aspect, alone or in combination with one or more of the first aspect through the seventh aspect, further including: determining, by the UE, a sensing window according to the reduced sensing window duration; and sensing, by the UE, a shared communication channel for interference over the sensing window.

In a ninth aspect, alone or in combination with one or more of the first aspect through the eighth aspect, wherein the determining the sensing window includes: counting a number of receiving mode slots from the resource selection trigger until a scheduled transmission time of the sidelink transmission; and adding a counter for each receive beam used for the sensing in each receiving mode slot, wherein the counter is weighted according to a width of the each receive beam, wherein a sum of the counter for the each receive beam equal the reduced sensing window duration.

In a tenth aspect, alone or in combination with one or more of the first aspect through the ninth aspect, wherein the determining the sensing window includes: counting a number of historical slots for which sensing results are known to the UE; and counting a number of receiving mode slots from the resource selection trigger until a scheduled transmission time of the sidelink transmission, wherein the number of historical slots and the number of receiving mode slots equal the reduced sensing window duration.

In an eleventh aspect, alone or in combination with one or more of the first aspect through the tenth aspect, wherein the predetermined set of effective short-term sensing durations include both one or more non-zero-length durations and one or more zero-length sensing durations.

In a twelfth aspect, alone or in combination with one or more of the first aspect through the eleventh aspect, wherein the long-term interference sensing statistics include one or more of: acknowledgement statistics including one or more acknowledgement responses requested by the UE within a moving-average window; and a number of virtual collisions detected by the UE within the moving-average window.

In a thirteenth aspect, alone or in combination with one or more of the first aspect through the twelfth aspect, wherein the one or more acknowledgement response are collected by the UE over one of: a same transmit beam to a same receive beam; the same transmit beam to any receive beam; any transmit beam to the any receive beam, wherein the any transmit beam has a boresight direction within a predetermined range of the boresight direction of a candidate transmit beam for the sidelink transmission; the any transmit beam towards the same receive beam; or the any transmit beam.

In a fourteenth aspect, alone or in combination with one or more of the first aspect through the thirteenth aspect, wherein the number of virtual collisions detected include initially-selected sidelink resources that are subsequently declared unavailable by a re-evaluation process prior to a scheduled transmission time.

A fifteenth aspect configured for wireless communication includes a UE with at least one processor; and a memory coupled to the at least one processor, wherein the at least one processor is configured to identify, by the UE, a resource selection trigger indicating selection of one or more sidelink slots from a resource selection window that includes a set of candidate sidelink slots of a plurality of available sidelink slots; to obtain, by the UE, long-term interference sensing statistics observed by the UE prior to the resource selection trigger; to reduce, by the UE, a default sensing window length in accordance with the long-term interference sensing statistics; and to transmit, by the UE, a sidelink transmission in the one or more sidelink slots.

In a sixteenth aspect, alone or in combination with the fifteenth aspect, wherein the configuration of the at least one processor to reduce the default sensing window length is further in accordance with a combination of one or more features identified for the sidelink transmission, wherein the one or more features includes one or more of: a transmit beam, over which the sidelink transmission is to be transmitted, with a beam width less than a beam width threshold; a transmission duty cycle of the UE that is lower than a duty cycle threshold; a beam-specific transmission duty cycle that is lower than a beam-specific duty cycle threshold; a dwelling time of the transmit beam over a predetermined sliding window is lower than a dwelling time threshold; a transmit power lower than a power threshold; and a payload of the sidelink transmission, wherein the payload has a priority level greater that a priority threshold.

In a seventeenth aspect, alone or in combination with one or more of the fifteenth aspect through the sixteenth aspect, wherein the transmit beam includes one of: a single transmit beam; or a set of clustered beams clustered at a same boresight direction.

In an eighteenth aspect, alone or in combination with one or more of the fifteenth aspect through the seventeenth aspect, wherein the configuration of the at least one processor to reduce the default sensing window length includes configuration of the at least one processor: to identify a reduction combination of long-term interference sensing statistics and the combination of the one or more features of the sidelink transmission; and to select a reduced sensing window duration from a predetermined set of effective short-term sensing durations, wherein each duration of the predetermined set of effective short-term sensing durations is indexed according to the reduction combination.

In a nineteenth aspect, alone or in combination with one or more of the fifteenth aspect through the eighteenth aspect, wherein the each duration of the predetermined set of effective short-term sensing durations is further associated with a corresponding receive beam for sensing over the reduced sensing window.

In a twentieth aspect, alone or in combination with one or more of the fifteenth aspect through the nineteenth aspect, wherein the corresponding receive beam includes any combination of one or more of: a receive beam corresponding to the transmit beam; the receive beam with a boresight direction within a predetermined range of the boresight direction of the transmit beam; or the receive beam with a beam width greater than the beam width of the transmit beam.

In a twenty-first aspect, alone or in combination with one or more of the fifteenth aspect through the twentieth aspect, wherein the each duration of the predetermined set of effective short-term sensing durations includes one or more alternative durations corresponding to the corresponding receive beam for sensing over the reduced sensing window; and wherein the configuration of the at least one processor to select the reduced sensing window duration includes configuration of the at least one processor to select an alternative duration of the one or more alternative durations corresponding to the corresponding receive beam.

In a twenty-second aspect, alone or in combination with one or more of the fifteenth aspect through the twenty-first aspect, further including configuration of the at least one processor: to determine, by the UE, a sensing window according to the reduced sensing window duration; and to sense, by the UE, the shared communication channel for interference over the sensing window.

In a twenty-third aspect, alone or in combination with one or more of the fifteenth aspect through the twenty-second aspect, wherein the configuration of the at least one processor to determine the sensing window includes configuration of the at least one processor: to count a number of receiving mode slots from the resource selection trigger until a scheduled transmission time of the sidelink transmission; and to add a counter for each receive beam used for the configuration of the at least one processor to sense in each receiving mode slot, wherein the counter is weighted according to a width of the each receive beam, wherein a sum of the counter for the each receive beam equal the reduced sensing window duration.

In a twenty-fourth aspect, alone or in combination with one or more of the fifteenth aspect through the twenty-third aspect, wherein the configuration of the at least one processor to determine the sensing window includes configuration of the at least one processor: to count a number of historical slots for which sensing results are known to the UE; and to count a number of receiving mode slots from the resource selection trigger until a scheduled transmission time of the sidelink transmission, wherein the number of historical slots and the number of receiving mode slots equal the reduced sensing window duration.

In a twenty-fifth aspect, alone or in combination with one or more of the fifteenth aspect through the twenty-fourth aspect, wherein the predetermined set of effective short-term sensing durations include both one or more non-zero-length durations and one or more zero-length sensing durations.

In a twenty-sixth aspect, alone or in combination with one or more of the fifteenth aspect through the twenty-fifth aspect, wherein the long-term interference sensing statistics include one or more of: acknowledgement statistics including one or more acknowledgement responses requested by the UE within a moving-average window; and a number of virtual collisions detected by the UE within the moving-average window.

In a twenty-seventh aspect, alone or in combination with one or more of the fifteenth aspect through the twenty-sixth aspect, wherein the one or more acknowledgement response are collected by the UE over one of: a same transmit beam to a same receive beam; the same transmit beam to any receive beam; any transmit beam to the any receive beam, wherein the any transmit beam has a boresight direction within a predetermined range of the boresight direction of a candidate transmit beam for the sidelink transmission; the any transmit beam towards the same receive beam; or the any transmit beam.

In a twenty-eighth aspect, alone or in combination with one or more of the fifteenth aspect through the twenty-seventh aspect, wherein the number of virtual collisions detected include initially-selected sidelink resources that are subsequently declared unavailable by a re-evaluation process prior to a scheduled transmission time.

A twenty-ninth aspect configured for wireless communication including means for identifying, by a UE, a resource selection trigger indicating selection of one or more sidelink slots from a resource selection window that includes a set of candidate sidelink slots of a plurality of available sidelink slots; means for obtaining, by the UE, long-term interference sensing statistics observed by the UE prior to the resource selection trigger; means for reducing, by the UE, a default sensing window length in accordance with the long-term interference sensing statistics; and means for transmitting, by the UE, a sidelink transmission in the one or more sidelink slots.

In a thirtieth aspect, alone or in combination with the twenty-ninth aspect, wherein the means for reducing the default sensing window length is further in accordance with a combination of one or more features identified for the sidelink transmission, wherein the one or more features includes one or more of: a transmit beam, over which the sidelink transmission is to be transmitted, with a beam width less than a beam width threshold; a transmission duty cycle of the UE that is lower than a duty cycle threshold; a beam-specific transmission duty cycle that is lower than a beam-specific duty cycle threshold; a dwelling time of the transmit beam over a predetermined sliding window is lower than a dwelling time threshold; a transmit power lower than a power threshold; and a payload of the sidelink transmission, wherein the payload has a priority level greater that a priority threshold.

In a thirty-first aspect, alone or in combination with one or more of the twenty-ninth aspect or the thirtieth aspect, wherein the transmit beam includes one of: a single transmit beam; or a set of clustered beams clustered at a same boresight direction.

In a thirty-second aspect, alone or in combination with one or more of the twenty-ninth aspect through the thirty-first aspect, wherein the means for reducing the default sensing window length includes: means for identifying a reduction combination of long-term interference sensing statistics and the combination of the one or more features of the sidelink transmission; and means for selecting a reduced sensing window duration from a predetermined set of effective short-term sensing durations, wherein each duration of the predetermined set of effective short-term sensing durations is indexed according to the reduction combination.

In a thirty-third aspect, alone or in combination with one or more of the twenty-ninth aspect through the thirty-second aspect, wherein the each duration of the predetermined set of effective short-term sensing durations is further associated with a corresponding receive beam for sensing over the reduced sensing window.

In a thirty-fourth aspect, alone or in combination with one or more of the twenty-ninth aspect through the thirty-third aspect, wherein the corresponding receive beam includes any combination of one or more of: a receive beam corresponding to the transmit beam; the receive beam with a boresight direction within a predetermined range of the boresight direction of the transmit beam; or the receive beam with a beam width greater than the beam width of the transmit beam.

In a thirty-fifth aspect, alone or in combination with one or more of the twenty-ninth aspect through the thirty-fourth aspect, wherein the each duration of the predetermined set of effective short-term sensing durations includes one or more alternative durations corresponding to the corresponding receive beam for means for sensing over the reduced sensing window; and wherein the means for selecting the reduced sensing window duration includes means for selecting an alternative duration of the one or more alternative durations corresponding to the corresponding receive beam.

In a thirty-sixth aspect, alone or in combination with one or more of the twenty-ninth aspect through the thirty-fifth aspect, further including: means for determining, by the UE, a sensing window according to the reduced sensing window duration; and means for sensing, by the UE, the shared communication channel for interference over the sensing window.

In a thirty-seventh aspect, alone or in combination with one or more of the twenty-ninth aspect through the thirty-sixth aspect, wherein the means for determining the sensing window includes: means for counting a number of receiving mode slots from the resource selection trigger until a scheduled transmission time of the sidelink transmission; and means for adding a counter for each receive beam used for the sensing in each receiving mode slot, wherein the counter is weighted according to a width of the each receive beam, wherein a sum of the counter for the each receive beam equal the reduced sensing window duration.

In a thirty-eighth aspect, alone or in combination with one or more of the twenty-ninth aspect through the thirty-seventh aspect, wherein the means for determining the sensing window includes: means for counting a number of historical slots for which sensing results are known to the UE; and means for counting a number of receiving mode slots from the resource selection trigger until a scheduled transmission time of the sidelink transmission, wherein the number of historical slots and the number of receiving mode slots equal the reduced sensing window duration.

In a thirty-ninth aspect, alone or in combination with one or more of the twenty-ninth aspect through the thirty-eighth aspect, wherein the predetermined set of effective short-term sensing durations include both one or more non-zero-length durations and one or more zero-length sensing durations.

In a fortieth aspect, alone or in combination with one or more of the twenty-ninth aspect through the thirty-ninth aspect, wherein the long-term interference sensing statistics include one or more of: acknowledgement statistics including one or more acknowledgement responses requested by the UE within a moving-average window; and a number of virtual collisions detected by the UE within the moving-average window.

In a forty-first aspect, alone or in combination with one or more of the twenty-ninth aspect through the fortieth aspect, wherein the one or more acknowledgement response are collected by the UE over one of: a same transmit beam to a same receive beam; the same transmit beam to any receive beam; any transmit beam to the any receive beam, wherein the any transmit beam has a boresight direction within a predetermined range of the boresight direction of a candidate transmit beam for the sidelink transmission; the any transmit beam towards the same receive beam; or the any transmit beam.

In a forty-second aspect, alone or in combination with one or more of the twenty-ninth aspect through the forty-first aspect, wherein the number of virtual collisions detected include initially-selected sidelink resources that are subsequently declared unavailable by a re-evaluation process prior to a scheduled transmission time.

A forty-third aspect includes a non-transitory computer-readable medium having program code recorded thereon, in which the program code includes program code executable by a computer for causing the computer to identify, by a UE, a resource selection trigger indicating selection of one or more sidelink slots from a resource selection window that includes a set of candidate sidelink slots of a plurality of available sidelink slots; program code executable by the computer for causing the computer to obtain, by the UE, long-term interference sensing statistics observed by the UE prior to the resource selection trigger; program code executable by the computer for causing the computer to reduce, by the UE, a default sensing window length in accordance with the long-term interference sensing statistics; and program code executable by the computer for causing the computer to transmit, by the UE, a sidelink transmission in the one or more sidelink slots.

In a forty-fourth aspect, alone or in combination with the forty-third aspect, wherein the program code executable by the computer for causing the computer to reduce the default sensing window length is executed further in accordance with a combination of one or more features identified for the sidelink transmission, wherein the one or more features includes one or more of: a transmit beam, over which the sidelink transmission is to be transmitted, with a beam width less than a beam width threshold; a transmission duty cycle of the UE that is lower than a duty cycle threshold; a beam-specific transmission duty cycle that is lower than a beam-specific duty cycle threshold; a dwelling time of the transmit beam over a predetermined sliding window is lower than a dwelling time threshold; a transmit power lower than a power threshold; and a payload of the sidelink transmission, wherein the payload has a priority level greater that a priority threshold.

In a forty-fifth aspect, alone or in combination with the forty-third aspect or the forty-fourth aspect, wherein the transmit beam includes one of: a single transmit beam; or a set of clustered beams clustered at a same boresight direction.

In a forty-sixth aspect, alone or in combination with the forty-third aspect through the forty-fifth aspect, wherein the program code executable by the computer for causing the computer to reduce the default sensing window length includes program code executable by the computer for causing the computer: to identify a reduction combination of long-term interference sensing statistics and the combination of the one or more features of the sidelink transmission; and to select a reduced sensing window duration from a predetermined set of effective short-term sensing durations, wherein each duration of the predetermined set of effective short-term sensing durations is indexed according to the reduction combination.

In a forty-seventh aspect, alone or in combination with the forty-third aspect through the forty-sixth aspect, wherein the each duration of the predetermined set of effective short-term sensing durations is further associated with a corresponding receive beam for sensing over the reduced sensing window.

In a forty-eighth aspect, alone or in combination with the forty-third aspect through the forty-seventh aspect, wherein the corresponding receive beam includes any combination of one or more of: a receive beam corresponding to the transmit beam; the receive beam with a boresight direction within a predetermined range of the boresight direction of the transmit beam; or the receive beam with a beam width greater than the beam width of the transmit beam.

In a forty-ninth aspect, alone or in combination with the forty-third aspect through the forty-eighth aspect, wherein the each duration of the predetermined set of effective short-term sensing durations includes one or more alternative durations corresponding to the corresponding receive beam for sensing over the reduced sensing window; and wherein the program code executable by the computer for causing the computer to select the reduced sensing window duration includes program code executable by the computer for causing the computer to select an alternative duration of the one or more alternative durations corresponding to the corresponding receive beam.

In a fiftieth aspect, alone or in combination with the forty-third aspect through the forty-ninth aspect, further including program code executable by the computer for causing the computer: to determine, by the UE, a sensing window according to the reduced sensing window duration; and to sense, by the UE, the shared communication channel for interference over the sensing window.

In a fifty-first aspect, alone or in combination with the forty-third aspect through the fiftieth aspect, wherein the program code executable by the computer for causing the computer to determine the sensing window includes program code executable by the computer for causing the computer: to count a number of receiving mode slots from the resource selection trigger until a scheduled transmission time of the sidelink transmission; and to add a counter for each receive beam used for the configuration of the at least one processor to sense in each receiving mode slot, wherein the counter is weighted according to a width of the each receive beam, wherein a sum of the counter for the each receive beam equal the reduced sensing window duration.

In a fifty-second aspect, alone or in combination with the forty-third aspect through the fifty-first aspect, wherein the program code executable by the computer for causing the computer to determine the sensing window includes program code executable by the computer for causing the computer: to count a number of historical slots for which sensing results are known to the UE; and to count a number of receiving mode slots from the resource selection trigger until a scheduled transmission time of the sidelink transmission, wherein the number of historical slots and the number of receiving mode slots equal the reduced sensing window duration.

In a fifty-third aspect, alone or in combination with the forty-third aspect through the fifty-second aspect, wherein the predetermined set of effective short-term sensing durations include both one or more non-zero-length durations and one or more zero-length sensing durations.

In a fifty-fourth aspect, alone or in combination with the forty-third aspect through the fifty-third aspect, wherein the long-term interference sensing statistics include one or more of: acknowledgement statistics including one or more acknowledgement responses requested by the UE within a moving-average window; and a number of virtual collisions detected by the UE within the moving-average window.

In a fifty-fifth aspect, alone or in combination with the forty-third aspect through the fifty-fourth aspect, wherein the one or more acknowledgement response are collected by the UE over one of: a same transmit beam to a same receive beam; the same transmit beam to any receive beam; any transmit beam to the any receive beam, wherein the any transmit beam has a boresight direction within a predetermined range of the boresight direction of a candidate transmit beam for the sidelink transmission; the any transmit beam towards the same receive beam; or the any transmit beam.

In a fifty-sixth aspect, alone or in combination with the forty-third aspect through the fifty-fifth aspect, wherein the number of virtual collisions detected include initially-selected sidelink resources that are subsequently declared unavailable by a re-evaluation process prior to a scheduled transmission time.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by an internet of things (IoT) device at a millimeter wave (mmW) band, the method comprising:
  obtaining, by the IoT device, long-term interference sensing statistics observed by the IoT device prior to a resource selection trigger; and
  reducing, by the IoT device, a default sensing window length in accordance with the long-term interference sensing statistics.

2. The method of claim 1, wherein the reducing the default sensing window length is further in accordance with a combination of one or more features identified for a sidelink transmission, wherein the one or more features includes one or more of:
  a transmit beam, over which the sidelink transmission is to be transmitted, with a beam width less than a beam width threshold;
  a transmission duty cycle of the IoT device that is lower than a duty cycle threshold;
  a beam-specific transmission duty cycle that is lower than a beam-specific duty cycle threshold;
  a dwelling time of the transmit beam over a predetermined sliding window is lower than a dwelling time threshold;
  a transmit power lower than a power threshold; and
  a payload of the sidelink transmission, wherein the payload has a priority level greater that a priority threshold.

3. The method of claim 2, wherein the transmit beam includes one of:
  a single transmit beam; or
  a set of clustered beams clustered at a same boresight direction.

4. The method of claim 2, wherein the reducing the default sensing window length includes:
identifying a reduction combination of long-term interference sensing statistics and the combination of the one or more features of the sidelink transmission; and
selecting a reduced sensing window duration from a predetermined set of effective short-term sensing durations, wherein each duration of the predetermined set of effective short-term sensing durations is indexed according to the reduction combination.

5. The method of claim 4, wherein the each duration of the predetermined set of effective short-term sensing durations is further associated with a corresponding receive beam for sensing over a sensing window.

6. The method of claim 5, wherein the corresponding receive beam includes any combination of one or more of:
a receive beam corresponding to the transmit beam;
the receive beam with a boresight direction within a predetermined range of the boresight direction of the transmit beam; or
the receive beam with a beam width greater than the beam width of the transmit beam.

7. The method of claim 5,
wherein the each duration of the predetermined set of effective short-term sensing durations includes one or more alternative durations corresponding to the corresponding receive beam for sensing over the sensing window; and
wherein the selecting the reduced sensing window duration includes selecting an alternative duration of the one or more alternative durations corresponding to the corresponding receive beam.

8. The method of claim 5, further including:
determining, by the IoT device, the sensing window according to the reduced sensing window duration; and
sensing, by the IoT device, a shared communication channel for interference over the sensing window.

9. The method of claim 8, wherein the determining the sensing window includes:
counting a number of receiving mode slots from the resource selection trigger until a scheduled transmission time of the sidelink transmission; and
adding a counter for each receive beam used for the sensing in each receiving mode slot, wherein the counter is weighted according to a width of the each receive beam, wherein a sum of the counter for the each receive beam equal the reduced sensing window duration.

10. The method of claim 8, wherein the determining the sensing window includes:
counting a number of historical slots for which sensing results are known to the IoT device; and
counting a number of receiving mode slots from the resource selection trigger until a scheduled transmission time of the sidelink transmission, wherein the number of historical slots and the number of receiving mode slots equal the reduced sensing window duration.

11. The method of claim 4, wherein the predetermined set of effective short-term sensing durations include both one or more non-zero-length durations and one or more zero-length sensing durations.

12. The method of claim 1, wherein the long-term interference sensing statistics include one or more of:
acknowledgement statistics including one or more acknowledgement responses requested by the IoT device within a moving-average window; and
a number of virtual collisions detected by the IoT device within the moving-average window.

13. The method of claim 12, wherein the one or more acknowledgement responses are collected by the IoT device over one of:
a same transmit beam to a same receive beam;
the same transmit beam to any receive beam;
any transmit beam to the any receive beam, wherein the any transmit beam has a boresight direction within a predetermined range of the boresight direction of a candidate transmit beam for a sidelink transmission;
the any transmit beam towards the same receive beam; or
the any transmit beam.

14. The method of claim 12, wherein the number of virtual collisions detected include initially-selected sidelink resources that are subsequently declared unavailable by a re-evaluation process prior to a scheduled transmission time.

15. The IoT device of claim 1, further including:
identifying, by the IoT device, the resource selection trigger indicating selection of one or more sidelink slots from a resource selection window within the mmW band that includes a set of candidate sidelink slots of a plurality of available sidelink slots; and
transmitting, by the IoT device, a sidelink transmission in the one or more sidelink slots within the mmW band.

16. An internet of things (IoT) device configured for wireless communication, the IoT device comprising:
at least one processor; and
at least one memory coupled to the at least one processor, wherein the at least one processor is configured:
to obtain, by the IoT device, long-term interference sensing statistics observed by the IoT device prior to a resource selection trigger; and
to reduce, by the IoT device, a default sensing window length in accordance with the long-term interference sensing statistics.

17. The IOT device of claim 16, wherein the configuration of the at least one processor to reduce the default sensing window length is further in accordance with a combination of one or more features identified for a sidelink transmission, wherein the one or more features includes one or more of:
a transmit beam, over which the sidelink transmission is to be transmitted, with a beam width less than a beam width threshold;
a transmission duty cycle of the IoT device that is lower than a duty cycle threshold;
a beam-specific transmission duty cycle that is lower than a beam-specific duty cycle threshold;
a dwelling time of the transmit beam over a predetermined sliding window is lower than a dwelling time threshold;
a transmit power lower than a power threshold; and
a payload of the sidelink transmission, wherein the payload has a priority level greater that a priority threshold.

18. The IoT device of claim 17, wherein the transmit beam includes one of:
a single transmit beam; or
a set of clustered beams clustered at a same boresight direction.

19. The IoT device of claim 17, wherein the configuration of the at least one processor to reduce the default sensing window length includes configuration of the at least one processor:
to identify a reduction combination of long-term interference sensing statistics and the combination of the one or more features of the sidelink transmission; and
to select a reduced sensing window duration from a predetermined set of effective short-term sensing durations, wherein each duration of the predetermined set of effective short-term sensing durations is indexed according to the reduction combination.

20. The IoT device of claim 19, wherein the each duration of the predetermined set of effective short-term sensing durations is further associated with a corresponding receive beam for sensing over the reduced sensing window duration.

* * * * *